(12) United States Patent
Cho et al.

(10) Patent No.: US 10,802,310 B2
(45) Date of Patent: Oct. 13, 2020

(54) DISPLAY DEVICE

(71) Applicant: LG ELECTRONICS INC., Seoul (KR)

(72) Inventors: Jaewoo Cho, Seoul (KR); Jein Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 232 days.

(21) Appl. No.: 15/827,338

(22) Filed: Nov. 30, 2017

(65) Prior Publication Data

US 2019/0094600 A1 Mar. 28, 2019

(30) Foreign Application Priority Data

Sep. 26, 2017 (WO) ................. PCT/KR2017/010620

(51) Int. Cl.
*G02F 1/1333* (2006.01)
*G02F 1/13357* (2006.01)
*F21V 8/00* (2006.01)
*G06F 1/16* (2006.01)

(52) U.S. Cl.
CPC ..... *G02F 1/133308* (2013.01); *G02B 6/0088* (2013.01); *G02F 1/133606* (2013.01); *G02B 6/005* (2013.01); *G02B 6/0068* (2013.01); *G02B 6/0083* (2013.01); *G02F 1/133615* (2013.01); *G02F 2001/133317* (2013.01); *G02F 2001/133325* (2013.01); *G02F 2201/46* (2013.01); *G02F 2201/465* (2013.01); *G02F 2201/54* (2013.01); *G06F 1/1601* (2013.01)

(58) Field of Classification Search
CPC ......... G02F 1/133308; G02F 1/133606; G02B 6/0088

USPC ....................................................... 362/97.1
See application file for complete search history.

(56) References Cited

U.S. PATENT DOCUMENTS

| 9,392,148 B2* | 7/2016 | Kim ..................... H04N 5/2252 |
| 2012/0105761 A1* | 5/2012 | Lee ................... G02F 1/133308 349/58 |
| 2014/0176849 A1* | 6/2014 | Lee ................... G02F 1/133308 349/58 |
| 2017/0315400 A1* | 11/2017 | Ahn ..................... G02B 6/0085 |
| 2019/0094600 A1* | 3/2019 | Cho ..................... G02B 6/0088 |

FOREIGN PATENT DOCUMENTS

| KR | 10-2012-0118365 A | 10/2012 |
| KR | 10-2017-0017375 A | 2/2017 |
| KR | 10-2017-0049235 A | 5/2017 |
| KR | 10-1731641 B1 | 5/2017 |
| KR | 10-1749714 B1 | 7/2017 |

* cited by examiner

*Primary Examiner* — Michael G Lee
*Assistant Examiner* — David Tardif
(74) *Attorney, Agent, or Firm* — Birch, Stewart, Kolach & Birch, LLP

(57) ABSTRACT

A display device can include a display panel; a main frame positioned behind the display panel; a guide panel coupled to the main frame and supporting the display panel; and a front cover coupled to the main frame and covering a side of the display panel, in which the front cover includes a side wall covering the side of the display panel and a side of the frame; and a front wall extending from the side wall and facing a front surface of the display panel, and a hook protruding from an inside of the side wall, and a fixer is fixed to a rear surface of the main frame and inserted into the hook.

13 Claims, 48 Drawing Sheets

DISPLAY DEVICE

This application claims the benefit of International Application No. PCT/KR2017/010620 filed on Sep. 26, 2017, the entire contents of which are incorporated herein by reference for all purposes as if fully set forth herein.

BACKGROUND OF THE INVENTION

Field of the Invention

The present invention is related to a display device.

Discussion of the Related Art

As the information society develops, the demand for display devices is increasing in various forms. Recently, various display devices such as a liquid crystal display device (LCD), a plasma display panel (PDP), an electro luminescent display (ELD), a vacuum fluorescent display (VFD), and an organic light emitting diode (OLED) have been studied.

Among them, a liquid crystal panel of an LCD includes a TFT substrate and a color filter substrate facing each other with a liquid crystal layer and a liquid crystal layer interposed therebetween, and an image can be displayed using light provided from the backlight unit.

Recently, studies have been actively made to improve the assembling structure of a display device while securing the rigidity of the display device.

SUMMARY OF THE INVENTION

Accordingly, an object of the present disclosure is to address the above-described and other problems.

The object of the present invention may be to solve the above-mentioned problems and other problems.

Another object of the present invention is to provide a display device capable of improving the limitations of the structure design.

Another object of the present invention is to provide a display device in which a front cover is fastened to a rear surface of a main frame.

Another object of the present invention is to provide a fixer for fixing the front cover to the main frame.

Another object of the present invention is to provide a display device capable of improving the efficiency of assembling a display device.

According to an aspect of the present invention, there is provided a display panel comprising: a display panel; a main frame positioned behind the display panel; a guide panel coupled to the main frame and supporting the display panel; and a front cover coupled to the main frame and covering a side of the display panel, in which the front cover includes: a side wall covering the side of the display panel and a side of the frame; and a front wall extending from the sidewall and facing a front surface of the display panel.

According to at least one of the embodiments of the present invention, the limitations of the structural design of the display device can be improved.

According to at least one of the embodiments of the present invention, the front cover can be fastened to the rear surface of the main frame.

According to at least one of the embodiments of the present invention, the front cover can be fixed to the main frame using a fixer.

According to at least one of the embodiments of the present invention, the efficiency of the assembling process of the display device can be improved.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE EMBODIMENTS

Figure 1:
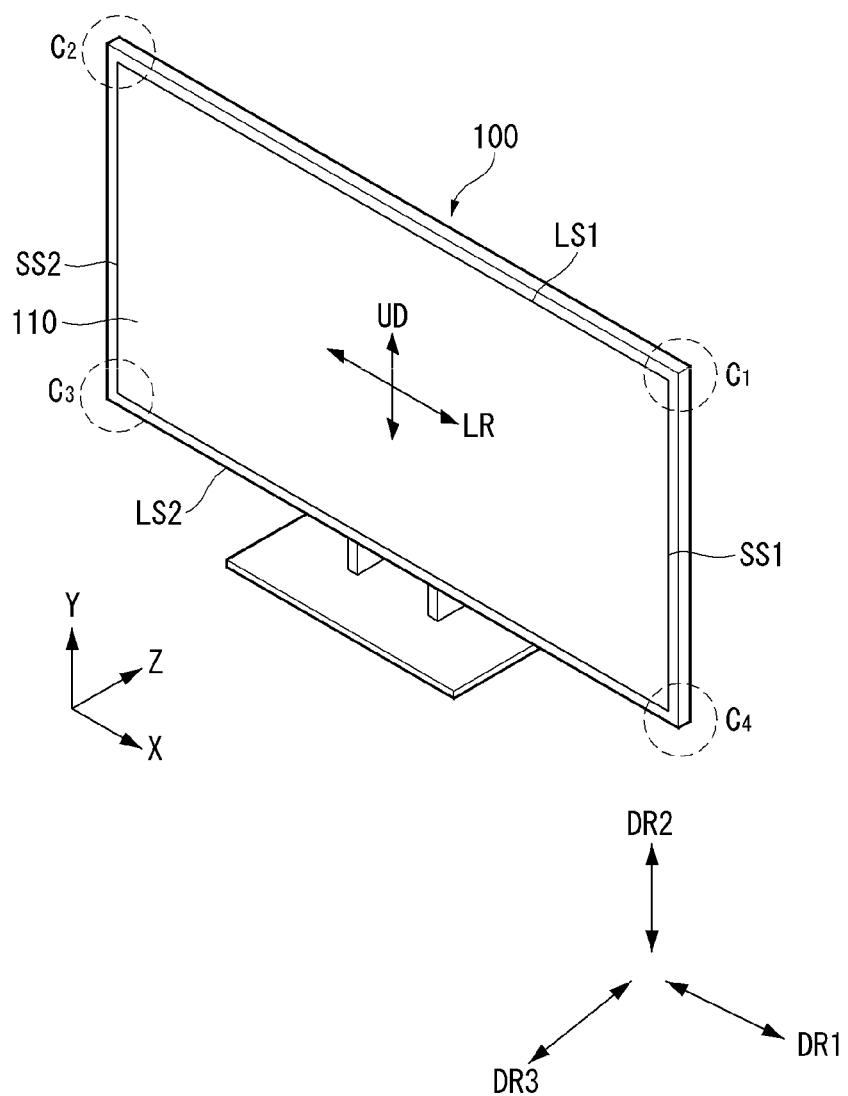
FIGS. 1 to 7D are showing examples of display devices related to embodiments of the present invention.

Reference will now be made in detail to embodiments of the invention, examples of which are illustrated in the accompanying drawings. Since the present invention may be modified in various ways and may have various forms, specific embodiments are illustrated in the drawings and are described in detail in the present specification. However, it should be understood that the present invention is not limited to specific disclosed embodiments, but includes all modifications, equivalents and substitutes included within the spirit and technical feature or scope of the present invention.

The terms "first," "second," etc. may be used to describe various components, but the components are not limited by such terms. The terms are used only for the purpose of distinguishing one component from other components. For example, a first component may be designated as a second component without departing from the scope of the present invention. In the same manner, the second component may be designated as the first component.

The term "and/or" encompasses both combinations of the plurality of related items disclosed and any item from among the plurality of related items disclosed.

When an arbitrary component is described as "being connected to" or "being linked to" another component, this should be understood to mean that still another component (s) may exist between them, although the arbitrary component may be directly connected to, or linked to, the second component. In contrast, when an arbitrary component is described as "being directly connected to" or "being directly linked to" another component, this should be understood to mean that no component exists between them.

The terms used in the present application are used to describe only specific embodiments or examples, and are not intended to limit the present invention. A singular expression can include a plural expression as long as it does not have an apparently different meaning in context.

In the present application, the terms "include" and "have" should be understood to be intended to designate that illustrated features, numbers, steps, operations, components, parts or combinations thereof exist and not to preclude the existence of one or more different features, numbers, steps, operations, components, parts or combinations thereof, or the possibility of the addition thereof.

Unless otherwise specified, all of the terms which are used herein, including the technical or scientific terms, have the same meanings as those that are generally understood by a person having ordinary knowledge in the art to which the present invention pertains. The terms defined in a generally used dictionary must be understood to have meanings identical to those used in the context of a related art, and are not to be construed to have ideal or excessively formal meanings unless they are obviously specified in the present application.

The following embodiments of the present invention are provided to those skilled in the art in order to describe the present invention more completely. Accordingly, shapes and sizes of elements shown in the drawings may be exaggerated for clarity.

Hereinafter, a liquid crystal display device (LCD) will be described as an example of the display panel, but the display panel applicable to the present invention is not limited to the liquid crystal panel.

Referring to FIG. 1, a display device 100 can include a first long side LS1, a second long side LS2, a first short side SS1, and a second short side SS2. The second long side LS2 can be opposite to the first long side LS1. The second short side SS2 can be opposite to the first short side SS1. The first short side SS1 can be adjacent to the first long side LS1 and the second long side LS2.

A region adjacent to the first short side SS1 can be a first short side region SS1. The first short side region SS1 may be referred to as a first side region. A region adjacent to the second short side SS2 can be a second short side region SS2. The first short side region SS1 may be referred to as a second side region. A region adjacent to the first long side LS1 can be a first long side region LS1. The first long side region LS1 may be referred to as a third side region. A region adjacent to the second long side LS2 can be a second long side region LS2. The second long side region LS2 may be referred to as a fourth side region.

The lengths of the first and second long sides LS1 and LS2 can be longer than the lengths of the first and second short sides SS1 and SS2. However, it is also possible that the lengths of the first and second long sides LS1 and LS2 are substantially equal to the lengths of the first and second short sides SS1 and SS2.

The first direction DR1 can be a direction parallel to the long side LS1 and LS2 of the display panel 100 and the second direction DR2 can be a direction parallel to the short side SS1 and SS2 of the display panel 100. The third direction DR3 can be a direction perpendicular to the first direction DR1 and/or the second direction DR2.

At least one of the first direction DR1 or the second direction DR2 may be referred to as a horizontal direction. The third direction DR3 may be referred to as a vertical direction.

A side on which the display device 100 displays an image may be referred to as a "forward direction," a "frontward direction," a "front side," or a "front surface." A side on which the display device 100 cannot observe the image may be referred to as a "backward direction," a "rearward direction," a "back side," a "rear side," a "back surface," or a "rear surface."

When looking at the display device 100 from the front side of the display device, the first long side LS1 side may be referred to as an "upper side" or "upper surface." Likewise, the second long side LS2 may be referred to as a "lower side" or a "lower surface." Similarly, the first short side SS1 may be referred to as a "right side" or a "right surface," and the second short side SS2 may be referred to as a "left side" or a "left surface."

The first long side LS1, the second long side LS2, the first short side SS1 and the second short side SS2 may be referred to as an edge of the display device 100. A point where the first long side LS1, the second long side LS2, the first short side SS1, and the second short side SS2 meet with each other can be referred to as a corner. A point at which the first long side LS1 and the first short side SS1 meet each other may be referred to as a first corner C1. A point at which the first long side LS1 and the second short side SS2 meet each other may be referred to as a second corner C2. A point at which the second short side SS2 meets the second long side LS2 may be referred to as a third corner C3. A point at which the second long side LS2 meets the first short side SS1 may be referred to as a fourth corner C4.

A direction from the first short side SS1 to the second short side SS2 or a direction from the second short side SS2 to the first short side SS1 may be referred to as the left and right direction LR. A direction from the first long side LS1 to the second long side LS2 or a direction from the second long side LS2 to the first long side LS1 may be referred to as the up and down direction UD.

Figure 2:
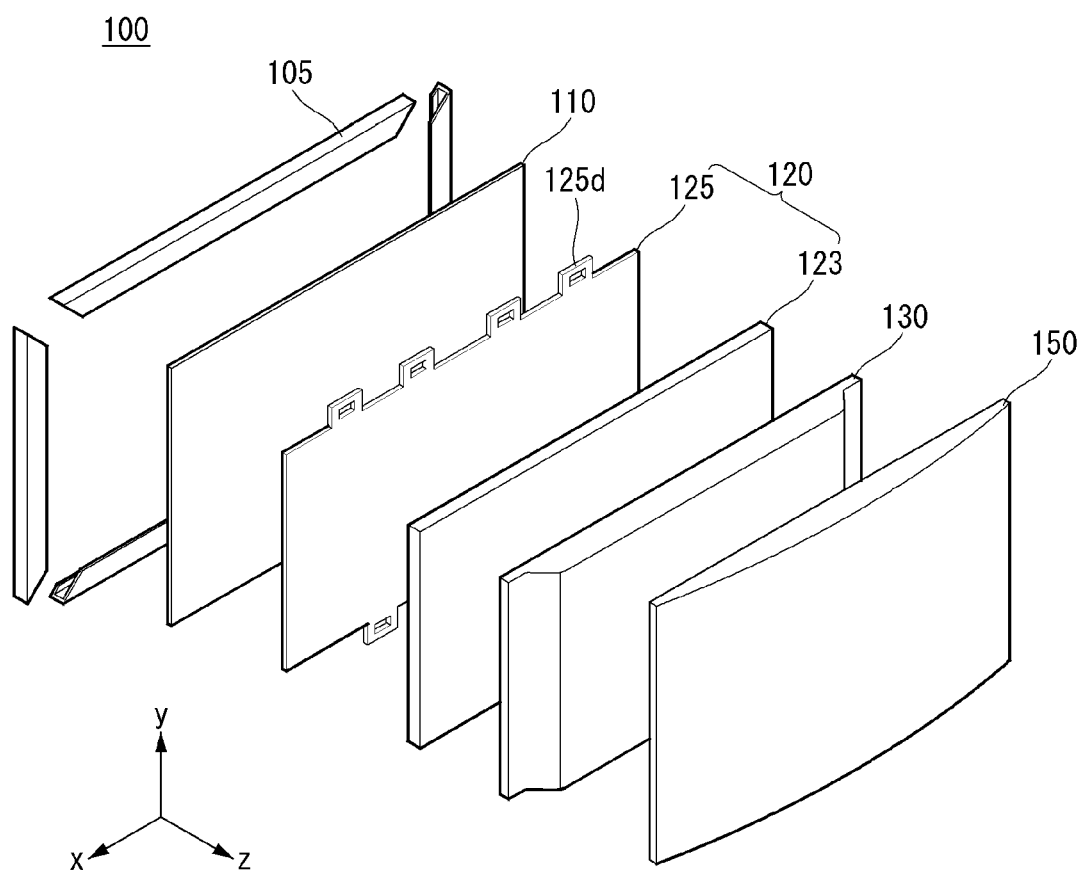

Referring to FIG. 2, the front cover 105 may cover a part of the front surface and the side surface of the display panel 110. The front cover 105 can include a front wall located on the front side of the display panel 110 and a side wall 105a1 located on the side of the display panel 110.

The display panel 110 is provided on the front surface of the display device 100 and can display images. The display panel 110 can include a plurality of pixels. The plurality of pixels can be composed of red, green, and blue sub-pixels. The display panel 110 can receive a driving signal from the panel driving unit to display an image.

The display panel 110 can be divided into an active area and a non-active area. The active area can be an area where an image is displayed. The non-active area can be an area where the image is not displayed.

The display panel 110 can include a front substrate and a rear substrate facing each other with a liquid crystal layer interposed therebetween. The rear substrate can be referred to as a back substrate.

The front substrate can include a plurality of pixels composed of red, green, and blue sub-pixels The rear substrate can include a plurality of switching elements. The rear substrate can switch the pixel electrodes. For example, the pixel electrode can change the molecular arrangement of the liquid crystal layer according to a control signal applied from the panel driver. The liquid crystal layer can include liquid crystal molecules. The liquid crystal molecules can change the arrangement in accordance with the voltage difference generated between the pixel electrode and the common electrode. The liquid crystal layer can transmit or block the light provided from the backlight unit 120 to the front substrate.

The backlight unit 120 can be positioned behind the display panel 110. The backlight unit 120 can include light sources. The backlight unit 120 can be coupled to the frame 130 in front of the frame 130.

The backlight unit 120 can be driven by a whole driving method or a partial driving method such as local dimming, impulsive, or the like. The backlight unit 120 can include an optical sheet 125 and an optical assembly 123.

The optical sheet 125 can transmit light generated from the backlight unit to the display panel 110 evenly or uniformly. The optical sheet 125 can be composed of a plurality of layers. For example, the optical sheet 125 can include a prism sheet, a diffusion sheet, and the like.

Figure 3:
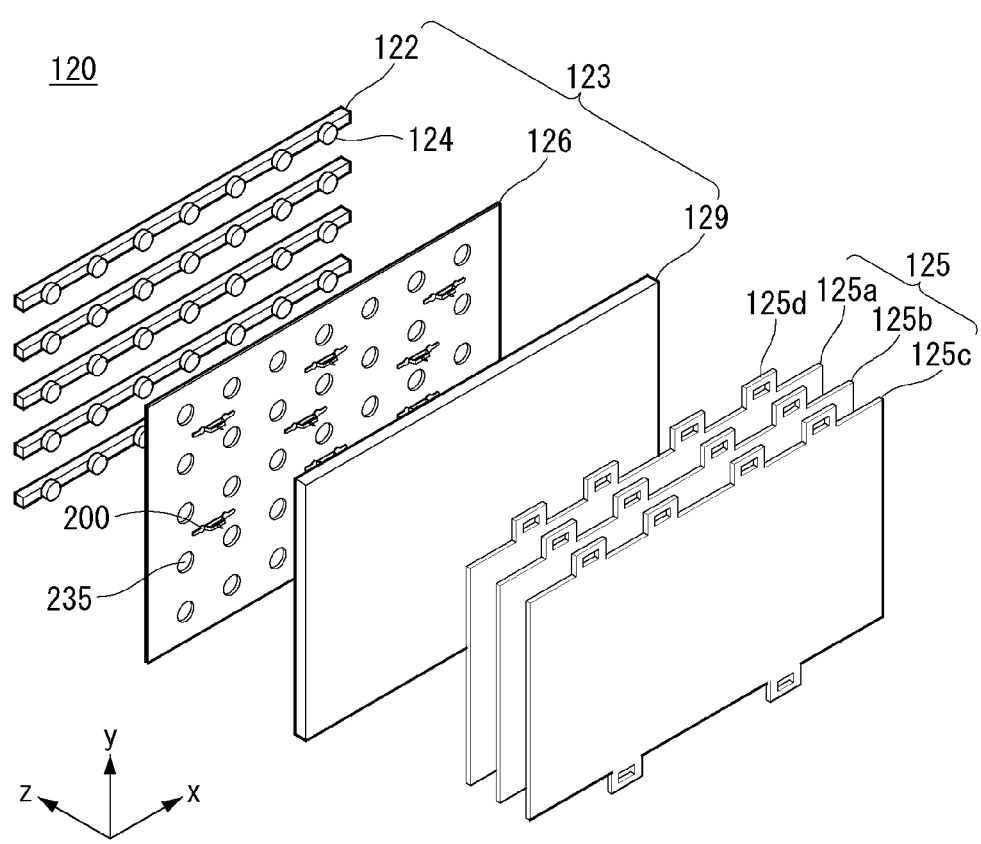

The optical sheet 125 can include a coupling portion 125d (see FIG. 3). The coupling portion 125d (see FIG. 3) can be coupled to the front cover 105, the main frame 130, and/or the back cover 150. Alternatively, the coupling portion 125*d* (see FIG. 3) can be fastened to a structure formed or coupled on the front cover 105, the main frame 130, and/or the back cover 150.

The optical assembly 123 may be located behind the optical sheet 125. The optical assembly 123 can provide the optical sheet 125 with light. The optical assembly 123 can include a light source that generates light.

The main frame 130 can support the components of the display device 100. For example, the main frame 130 can be combined with a configuration of the backlight unit 120 or the like.

The main frame 130 can be made of a metal such as an aluminum alloy. The main frame can be referred to as a rear cover and a rear frame.

The back cover 150 can be located at the rear or rear side of the display device 100. The back cover 150 can be coupled to the main frame 130. For example, the back cover 150 can be an injection-molded material of resins.

Referring to FIG. 3, the backlight unit 120 can include an optical assembly 123 and an optical sheet 125 positioned at the front side of the optical assembly 123.

The optical assembly 123 can include a substrate 122, at least one optical module 124 (e.g., LED), a reflective sheet 126, and a diffuser plate 129. The optical assembly 123 may not include some of these configurations.

The substrate 122 can have a plurality of strips extending in a first direction and spaced apart from each other by a predetermined distance in a second direction which is perpendicular to the first direction.

The substrate 122 can include at least one optical module 124 (e.g., LED) or on which the at least one optical module 124 is mounted. The substrate 122 can include an electrode pattern for connecting the adapter and the optical module 124. For example, a carbon nano-tube electrode pattern for coupling the optical module 124 and the adapter can be printed on the substrate 122.

The substrate 122 can be composed of at least one of polyethyleneterephthalate (PET), glass, polycarbonate (PC), and silicon.

The substrate 122 can be a printed circuit board (PCB) on which at least one optical module 124 is mounted. The optical modules 124 can be disposed on the substrate 122 at predetermined intervals in the first direction. The diameter of the optical module 124 can be greater than the width of the substrate 122. That is, the diameter of the optical module 124 can be larger than the length of the substrate 122 in the second direction.

The optical module 124 can include a light emitting diode (LED). For example, the optical module 124 can be a light emitting diode (LED) chip set or a light emitting diode package including at least one light emitting diode chip.

The optical module 124 can be composed of a colored LED or a white LED emitting various colors. For example, a colored LED can include at least one of a red LED, a blue LED, and a green LED.

The reflective sheet 126 can be positioned in front of the substrate 122. The reflective sheet 126 can have a plurality of through holes 235. The optical module 124 of the substrate 122 can be inserted into the plurality of through holes 235. That is, the reflective sheet 126 is located at the region of the substrate 122 other than the region on where the optical module 124 is positioned.

The reflective sheet 126 can reflect light emitted from the optical module 124 toward the forward direction or the front side of the display device. The reflective sheet 126 can reflect the light reflected from the diffuser plate 129 back to the forward direction or the front side of the display device.

The reflective sheet 126 can include at least one metal and a metal oxide which are reflective materials. Aluminum (Al), silver (Ag), gold (Au), and titanium dioxide (TiO2) can be used as a high reflectance material for the reflective materials.

The supporter 200 can be coupled to the reflective sheet 126. The supporter 200 can have a shape protruding forward from the reflective sheet 126. For example, the supporter 200 can be positioned between the reflective sheet 126 and the diffuser plate 129. Alternatively, the supporter 200 can be positioned between the reflective sheet 126 and the optical sheet 125. The supporter 200 can maintain the distance between the reflective sheet 126 and the diffuser plate 129. The supporter 200 can maintain the distance between the reflective sheet 126 and the optical sheet 125.

Resin can be deposited on the optical module 124 and/or the reflective sheet 126. The resin can diffuse the light emitted from the optical module 124.

The diffusion plate 129 can diffuse the light emitted from the optical module 124. For example, the optical module 124 can be a spot light source. A plurality of spot light sources can be arranged. The light provided forward from the plurality of optical modules 124 can have different brightness depending on the distance from the optical module 124. The diffusion plate 129 can uniformize the illumination profile depending on the arrangement of the plurality of optical modules 124.

The optical sheet 125 can be positioned in front of the diffuser plate 129. The rear surface of the optical sheet 125 is close to or in contact with the diffusion plate 129 and the front surface of the optical sheet 125 can be close to or in contact with the rear surface of the display panel 110 (see FIG. 1).

The optical sheet 125 can include at least one sheet or layer. For example, the optical sheet 125 can include one or more prism sheets and/or one or more diffusion sheets. The plurality of sheets included in the optical sheet 125 can be adhered and/or in contact with each other.

The optical sheet 125 can be composed of a plurality of sheets having different functions. For example, the optical sheet 125 can include first to third optical sheets 125*a* to 125*c*. For example, the first optical sheet 125*a* can be a diffusion sheet, and the second and third optical sheets 125*b* and 125*c* can be a prism sheet. The number and/or position of the diffusion sheet and the prism sheet can be changed.

The diffusion sheet can prevent the light or light coming from the diffusion plate 129 from being partially concentrated, for instance, a hot spot, thereby making the distribution of light more uniform. The prism sheet can collect light from the diffusion sheet and can provide the display panel 110 with light.

The engaging portion 125*d* can be formed on at least one of the sides or edges of the optical sheet 125. The engaging portion 125*d* can be formed on at least one of the first to third optical sheets 125*a* to 125*c*.

The engaging portion 125*d* can be formed at the long side of the optical sheet 125. The engaging portion 125*d* formed on the first long side and the engaging portion 125*d* formed on the second long side can be asymmetric. For example, the positions and/or the numbers of the engaging portions 125*d* of the first long side and the engaging portions 125*d* of the second long side can be different from each other.

Figure 4A:
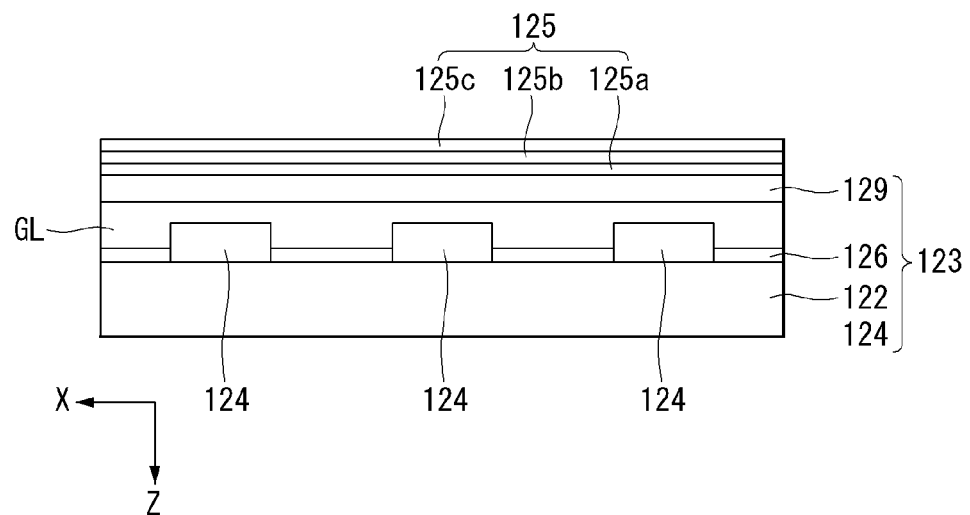

Referring to FIG. 4A, the optical module 124 can be mounted on the front surface of the substrate 122. A plurality of optical modules 124 can be spaced apart. A plurality of optical modules 124 can provide light forward direction of the display device.

The reflective sheet 126 can be disposed on the front surface of the substrate 122. The optical module 124 can be disposed between the reflective sheets 126.

The diffusion plate 129 can be located in front of the optical module 124. The diffuser plate 129 can be spaced apart from the optical module 124. The diffuser plate 129 can be positioned in front of the reflective sheet 126. The diffuser plate 129 can be disposed apart from the reflective sheet 126.

A gas layer GL can be formed between the diffusion plate 129 and the optical module 124. The gas layer GL can be formed between the diffusion plate 129 and the reflective sheet 126. The gas layer GL can comprise one or at least one stable gas. The gas layer GL can be referred to as an air layer. For example, the gas layer GL can comprise nitrogen and/or oxygen. Alternatively, the gas layer GL can comprise a gas which is the same as or similar to the composition of the air.

The optical sheet 125 can be disposed on the front surface of the diffusion plate 129. The optical sheet 125 can include a first to third optical sheets 125a, 125b, and 125c. The first optical sheet 125a can be positioned on the front surface of the diffusion plate 129. The second optical sheet 125b can be positioned on the front surface of the first optical sheet 125a. And the third optical sheet 125c can be positioned on the front surface of the second optical sheet 125b.

Figure 4B:
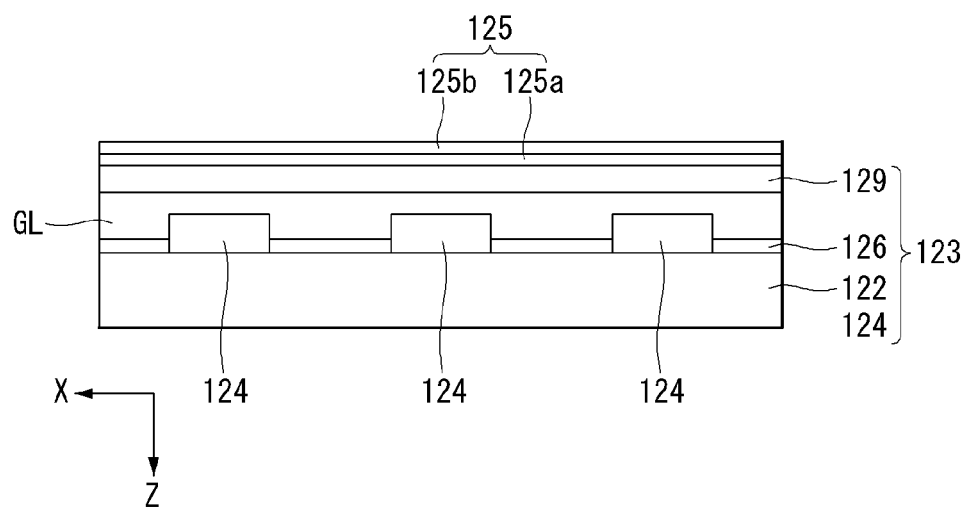

Referring to FIG. 4B, the optical sheet 125 can include a first optical sheet 125a and a second optical sheet 125b. The first optical sheet 125a can be a diffusion sheet. The second optical sheet 125b can be a prism sheet.

Figure 4C:
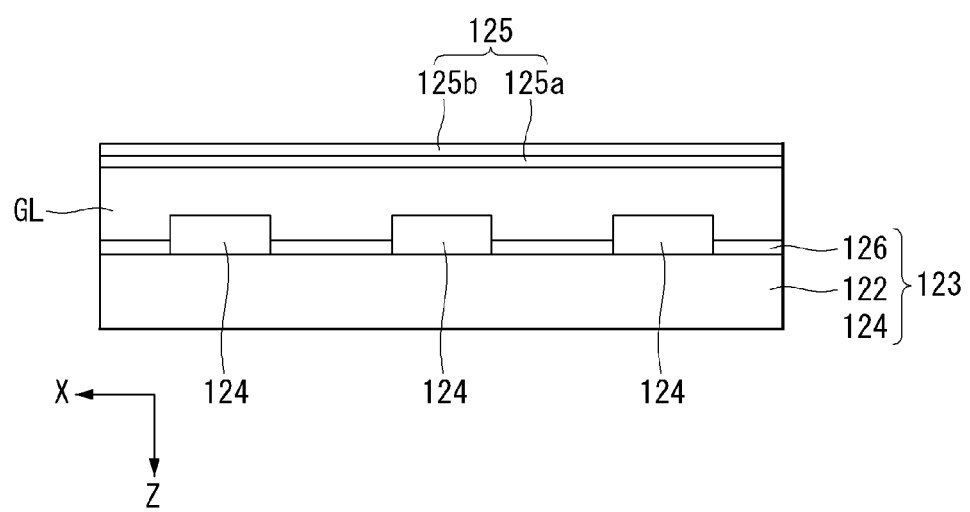

Referring to FIG. 4C, the optical sheet 125 can be positioned in front of the optical module 124. The optical sheet 125 can be positioned in front of the reflective sheet 126. The optical sheet 125 can include a first optical sheet 125a and a second optical sheet 125b. The first optical sheet 125a can be a diffusion sheet. The second optical sheet 125b can be a prism sheet.

Figure 5:
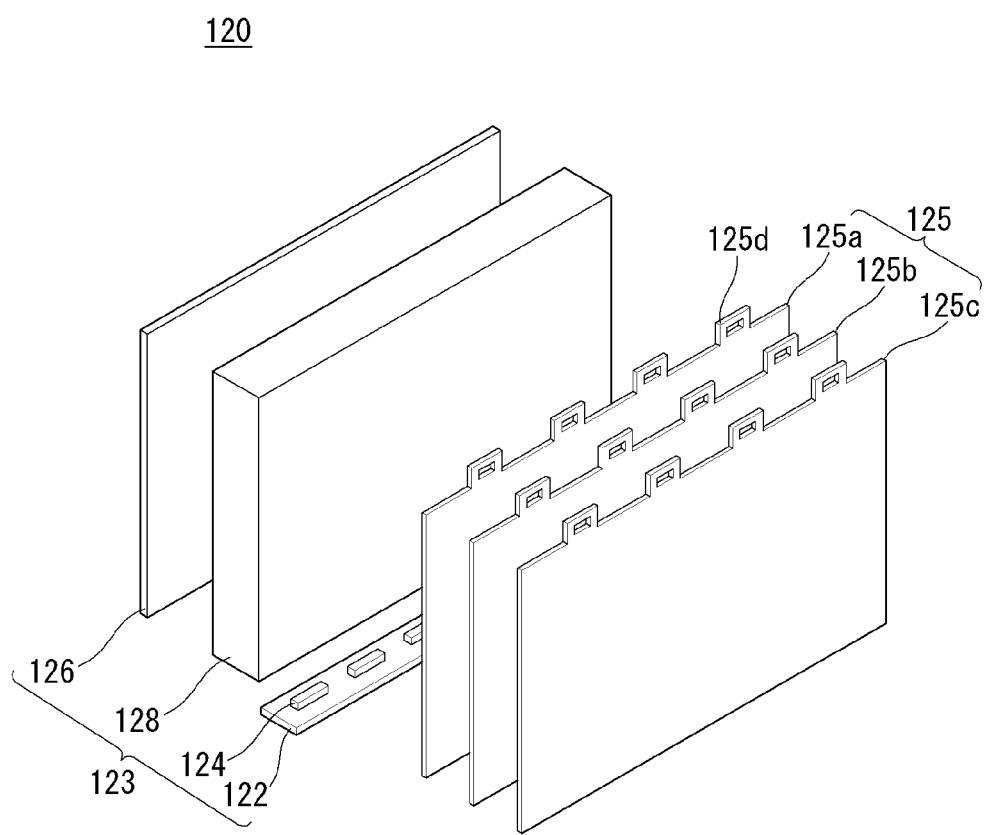

Referring to FIG. 5, the backlight unit 120 can include a substrate 122, an optical layer 123, and an optical sheet 125.

The optical layer 123 can include at least one optical assembly 124, a reflective sheet 126, and a light guide plate 128. The optical sheet 125 can be positioned in front side of the optical layer 123.

The substrate 122 can be located on one side of the optical layer 123. The substrate 122 can extend in the lengthwise or widthwise direction of the optical layer 123. A plurality of optical assemblies 124 can be disposed on the substrate 122 with maintaining a predetermined distance. Most of the light emitted from the optical assembly 124 can go into the light guide plate 128.

The reflective sheet 126 can be positioned behind the light guide plate 128. The reflective sheet 126 can reflect light in the light guide plate 128 in the forward direction of the light guide plate 128.

The reflective sheet 126 can be formed by vapor-depositing and/or coating a metal or a metal oxide. The reflective sheet 126 can be printed with an ink containing a metal material. The reflection sheet 126 can be formed using a vacuum deposition method such as a thermal evaporation method, an evaporation method, or a sputtering method. The reflection sheet 126 can be formed with a coating layer and/or a printing layer using a printing method, a gravure coating method, or a silk screen method.

The optical sheet 125 can include a plurality of sheets 125a to 125c. The plurality of sheets 125a to 125c can have different functions. The plurality of sheets 125a to 125c can be adhered and/or contacted each other. For example, the plurality of sheets 125a to 125c can include a diffusion sheet and a prism sheet.

The diffusion sheet can uniformly diffuse light emitted from the light guide plate 128. The diffusion sheet prevents light from being partially densely packed in the light guide plate 128 and can diffuses it, thereby making the brightness of the light more uniform. The prism sheet can condense the light diffused from the diffusion sheet and transfer or transmit the light into the display panel 110.

The engaging portion 125d can be formed on at least one of the edges of the optical sheet 125.

The engaging portion 125d can be formed at a long side edge of the optical sheet 125. The engaging portion 125d formed on the first long side and the engaging portion 125d formed on the second long side can be asymmetric. For example, the position and/or number of the engaging portion(s) 125d of the first long side and the engaging portion 125d of the second long side can be different from each other.

Figure 6:
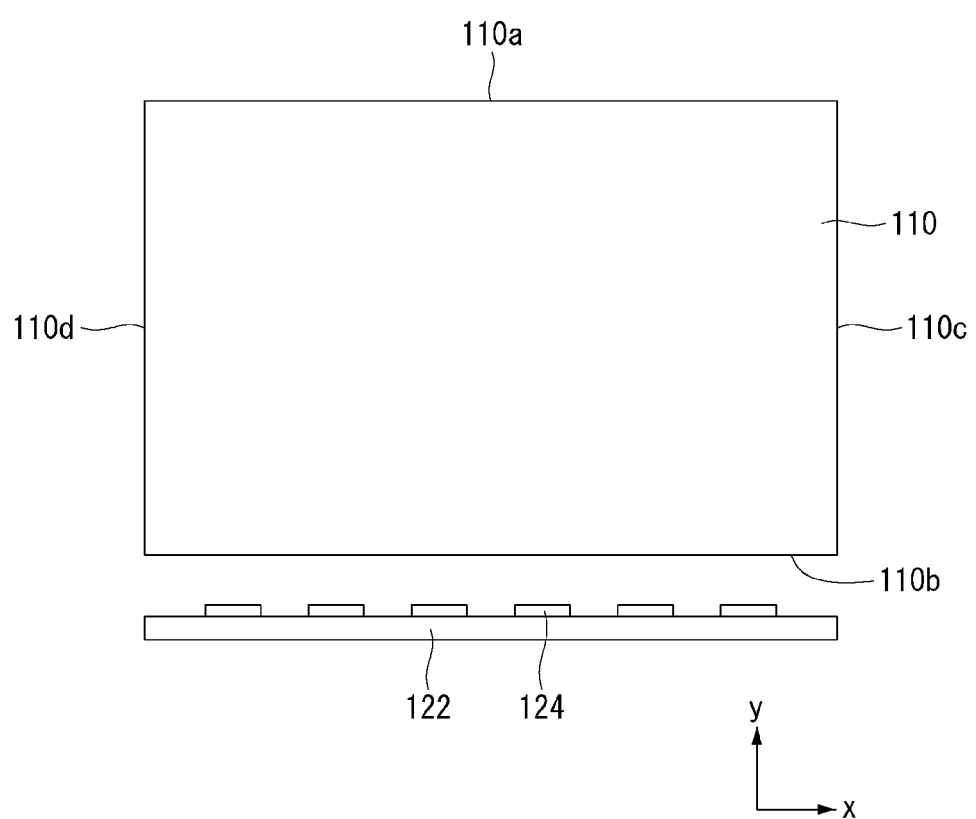

Referring to FIG. 6, the optical assembly 124 can emit light in a direction from the lower side 110b to the upper side 110a of the display panel 110. The light emitted from the optical assembly 124 is diffused from the lower side 110b to the upper side 110a of the display panel 110 by the light guide plate 128 to provide the whole or entire display panel 110 with light.

Figure 7A:
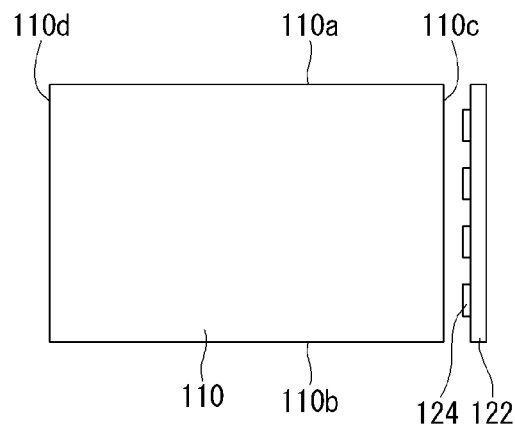

Referring to FIG. 7A, the optical assembly 124 can be positioned at the right side 110c of the display panel 110. And the optical assembly 124 can be located at the left side 110d of the display panel 110.

Figure 7B:
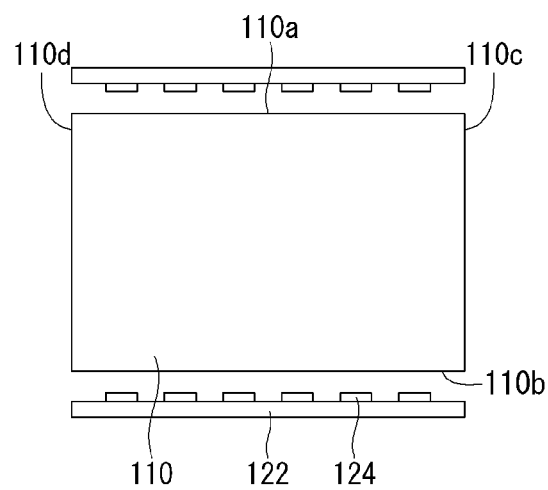
Figure 7C:
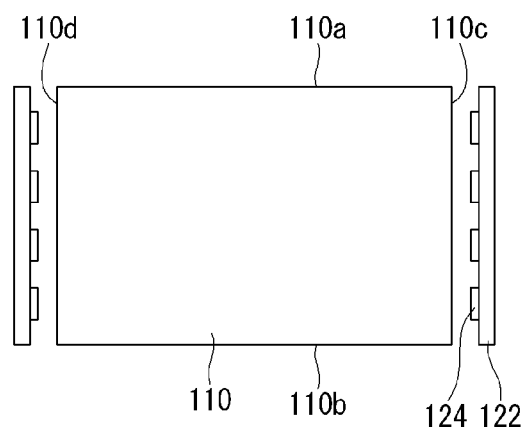
Figure 7C:
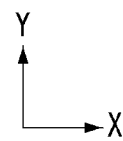
Figure 7D:
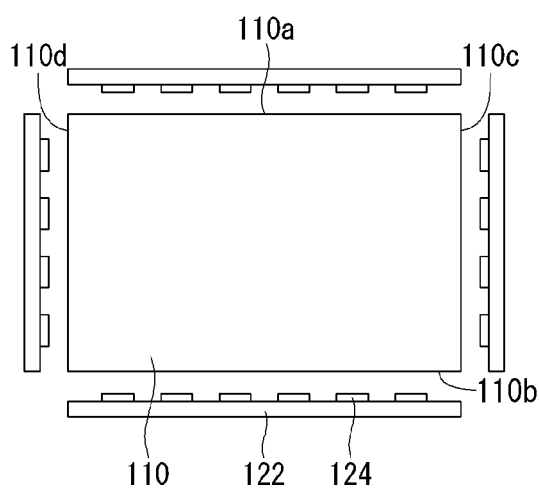
Figure 7D:
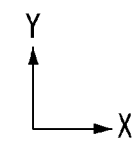

Referring to FIG. 7B, the optical assembly 124 can be positioned at the lower side 110b and the upper side 110a of the display panel 110. Referring to FIG. 7C, the optical assembly 124 can be positioned at the right side 110c and the left side 110d of the display panel 110. Referring to FIG. 7D, the optical assembly 124 can be positioned at the right side 110c, the left side 110d, the lower side 110b, and the upper side 110a of the display panel 110. The optical assembly 124 can be positioned near three sides of the right side surface 110c, the left side surface 110d, the lower side surface 110b, and the upper side surface 110a of the display panel 110.

Figure 8:
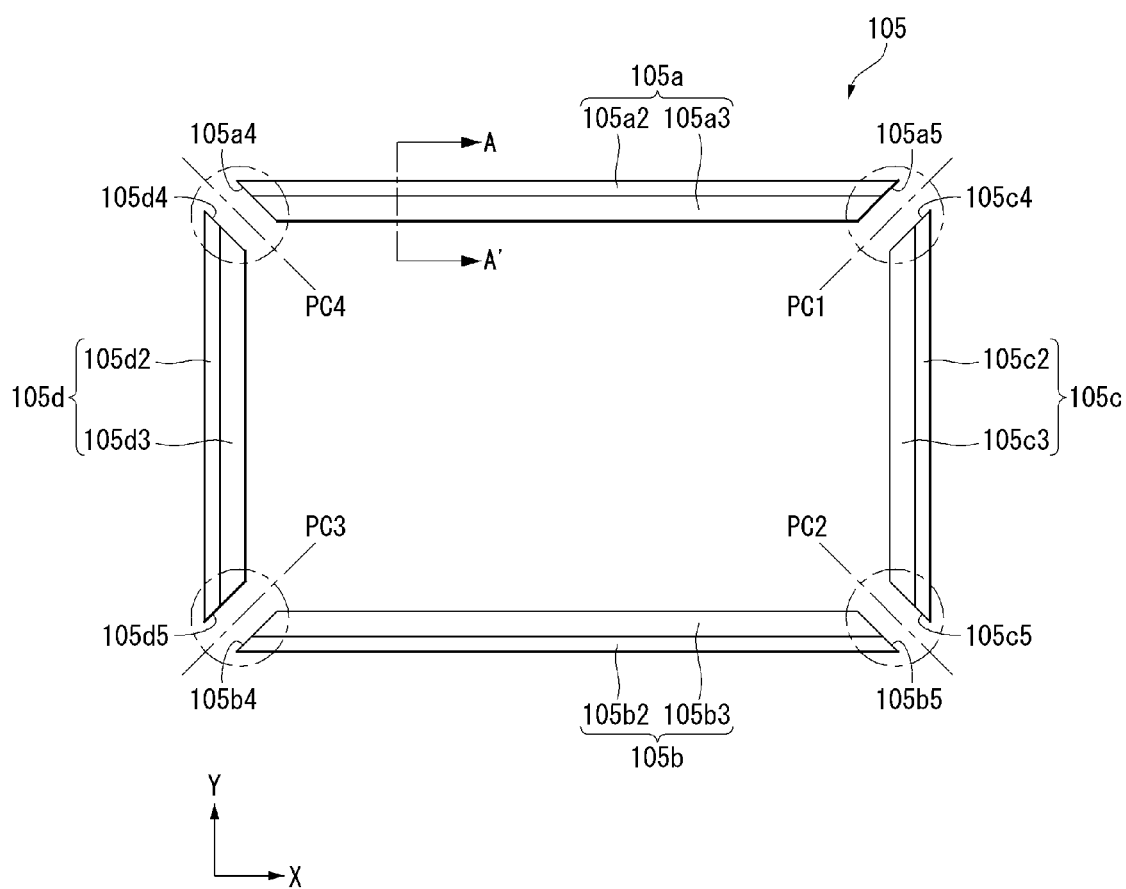
FIGS. 8 to 46 are showing examples of the configuration of a display device according to an embodiment of the present invention.
Figure 9:
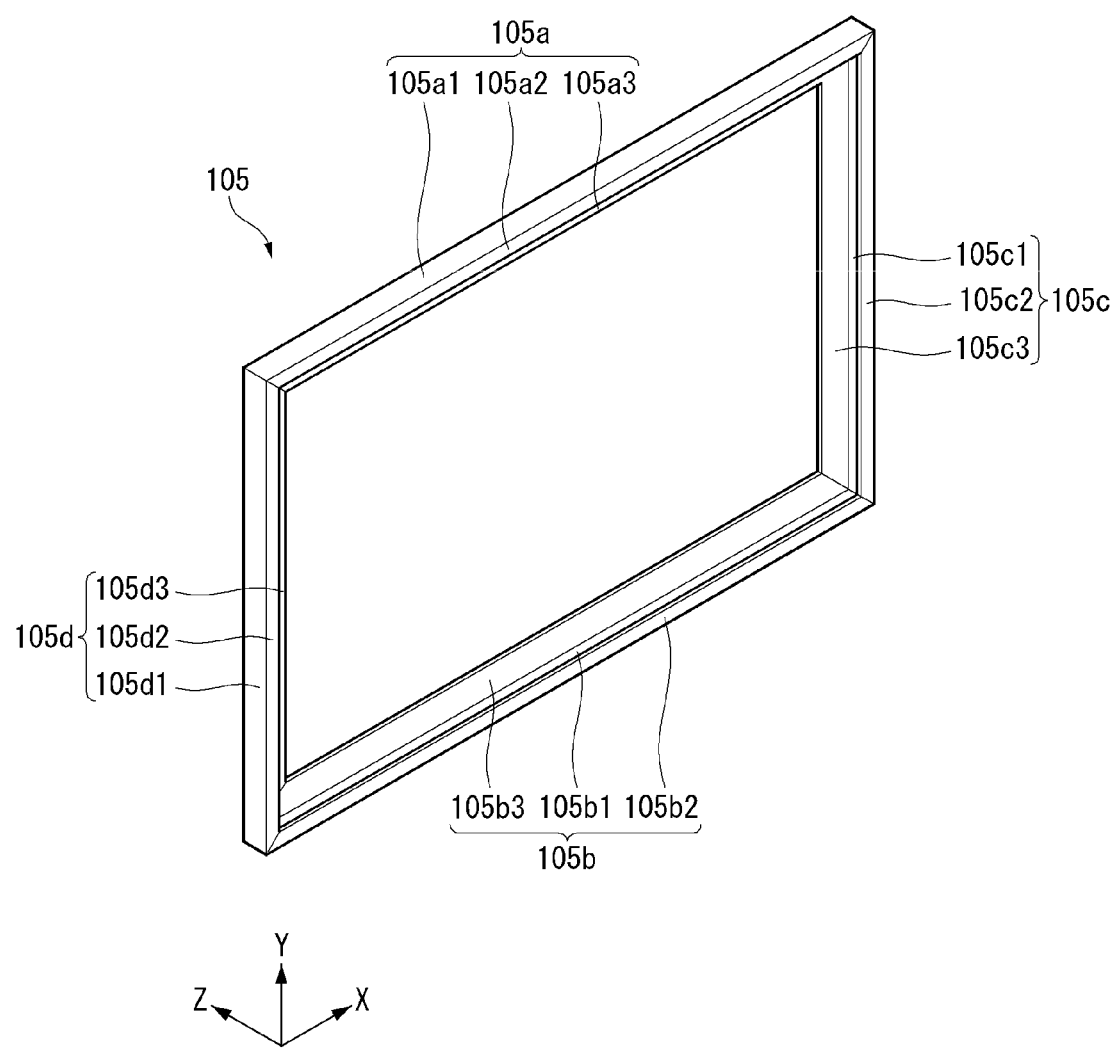

Referring to FIGS. 8 and 9, the front cover 105 can cover the display panel 110 (see FIG. 1) and the main frame 130 (see FIG. 2). The front cover 105 can be formed to surround a side of the display panel 110 (see FIG. 1) and a side of the main frame 130 (see FIG. 2). A part of the front of the front cover 105 and/or a side of the front cover 105 can be exposed to the outside of the display device.

The front cover 105 can be divided into at least one piece or more pieces. The front cover 105 can include a plurality of pieces 105a to 105d. For example, the front cover 105 can include a first piece 105a to a fourth piece 105d.

When looking at the display from the front of the display device, the first piece 105a can be disposed at the first long side LS1, the upper side, or the upper surface of the display device. The second piece 105b can be disposed on the second long side LS2, the lower side, or the lower surface of the display device.

When looking at the display from the front of the display device, the third piece 105c can be disposed at the first short side SS1, the right side, or the right surface of the display device. The fourth piece 105d can be disposed at the second short side SS2, the left side, or the left surface of display device.

A first side end 105a5 of the first piece 105a can be connected to a first side end 105c4 of the third piece 105c.

A corner where the first side end 105*a*5 of the first piece 105*a* and the first side end 105*c*4 of the third piece 105*c* are connected can be a first front corner PC1. The first side end 105*a*5 of the first piece 105*a* can be referred to as a right end 105*a*5 of the first piece 105*a*. The first side end 105*c*4 of the third piece 105*c* can be referred to as an upper end 105*c*4 of the third piece 105*c*.

The right end 105*a*5 of the first piece 105*a* can be in contact with the upper end 105*c*4 of the third piece 105*c*. The right end 105*a*5 of the first piece 105*a* can be spaced apart from the upper end 105*c*4 of the third piece 105*c* by a predetermined distance.

A second side end 105*c*5 of the third piece 105*c* can be connected to a first side end 105*b*5 of the second piece 105*b*. A corner where the second side end 105*c*5 of the third piece 105*c* and the first side end 105*b*5 of the second piece 105*b* are connected can be a second front corner PC2. The second side end 105*c*5 of the third piece 105*c* can be referred to as a lower end 105*c*5 of the third piece 105*c*. The first side end 105*b*5 of the second piece 105*b* can be referred to as a right end 105*b*5 of the second piece 105*b*.

The lower end 105*c*5 of the third piece 105*c* can be in contact with the right end 105*b*5 of the second piece 105*b*, it is not limited thereto. The lower end 105*c*5 of the third piece 105*c* can be spaced apart from the right end 105*b*5 of the second piece 105*b* by a predetermined distance.

A second side end 105*b*4 of the second piece 105*b* can be connected to a second side end 105*d*5 of the fourth piece 105*d*. A corner where the second side end 105*b*4 of the second piece 105*b* and the second side end 105*d*5 of the fourth piece 105*d* are connected can be a third front corner PC3. And the second side end 105*b*4 of the second piece 105*b* may be referred to as a left end 105*b*4 of the second piece 105*b*. The second side end 105*d*5 of the fourth piece 105*d* can be referred to as a lower end 105*d*5 of the fourth piece 105*d*.

The left end 105*b*4 of the second piece 105*b* can be in contact with the lower end 105*d*5 of the fourth piece 105*d*, the present invention is not limited thereto. The left end 105*b*4 of the second piece 105*b* can be spaced apart from the lower end 105*d*5 of the fourth piece 105*d* by a predetermined distance.

The first side end 105*d*4 of the fourth piece 105*d* can be connected to the second side end 105*a*4 of the first piece 105*a*. The corner where the first side end 105*d*4 of the fourth piece 105*d* and the second side end 105*a*4 of the first piece 105*a* are connected can be the fourth front corner PC4. The first side end 105*d*4 of the fourth piece 105*d* can be referred to as the upper end 105*d*4 of the fourth piece 105*d*. The second side end 105*a*4 of the first piece 105*a* can be referred to as the left end 105*a*4 of the first piece 105*a*.

The upper end 105*d*4 of the fourth piece 105*d* can be in contact with the left end 105*a*4 of the first piece 105*a*, but which is not limited thereto. The upper end 105*d*4 of the fourth piece 105*d* can be spaced apart from the left end 105*a*4 of the first piece 105*a* by a predetermined distance.

Further, the front cover 105 can be provided with fixers. Each of the fixers can be disposed between the first piece 105*a* to the fourth piece 105*d* to couple the first piece 105*a* to the fourth piece 105*d* each other.

Referring to FIG. 9, the front cover 105 can include sidewalls 105*a*1 to 105*d*1, first walls 105*a*2 to 105*d*2, and second walls 105*a*3 to 105*d*3. The first walls 105*a*2 to 105*d*2 and the second walls 105*a*3 to 105*d*3 can face each other. The sidewalls 105*a*1 to 105*d*1 can be extended from the first walls 105*a*2 to 105*d*2 toward the second walls 105*a*3 to 105*d*3 or connected with the first walls 105*a*2 to 105*d*2 toward the second walls 105*a*3 to 105*d*3.

The side walls 105*a*1 to 105*d*1 can cover one side of the display panel 110 (see FIG. 1) and one side of the main frame 103 (see FIG. 2). The side walls 105*a*1 to 105*d*1 can have a rectangular shape elongated in the vertical direction or the horizontal direction. The sidewalls 105*a*1 to 105*d*1 can have a width extending in the thickness direction.

Figure 23:
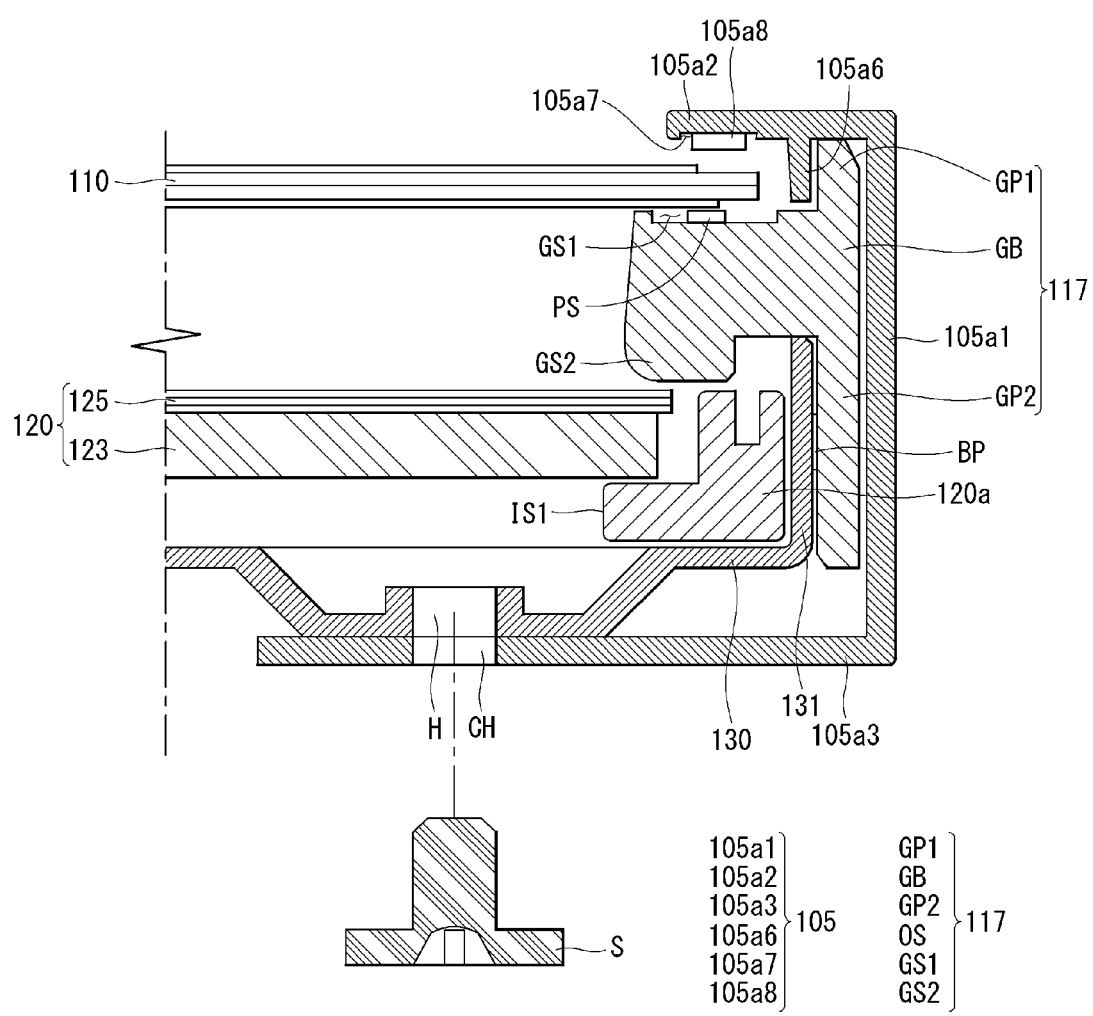

The inner surfaces of the side walls 105*a*1 to 105*d*1 can be spaced away from the outer surface of the guide panel 117 (see FIG. 23). The outer surface of the side wall 105*a*1 can be exposed to the outside of the display device.

The first walls 105*a*2 to 105*d*2 can face the front surface at the edge of the display panel 110 (see FIG. 23) and can be connected to one end of the sidewalls 105*a*1 to 105*d*1. The first walls 105*a*2 to 105*d*2 can be elongated along one end of the sidewalls 105*a*1 to 105*d*1. The first walls 105*a*2 to 105*d*2 may be referred to as front walls 105*a*2 to 105*d*2.

One end of the first walls 105*a*2 to 105*d*2 can be connected to one end of the sidewalls 105*a*1 to 105*d*1. The other ends of the first walls 105*a*2 to 105*d*2 can be spaced apart from the one ends of the sidewalls 105*a*1 to 105*d*1.

The length of the one end of the first walls 105*a*2 to 105*d*2 can be longer than the length of the other end of the first month 105*a*2 to 105*d*2. For example, the first walls 105*a*2 to 105*d*2 can be in the form of a trapezoid.

The second walls 105*a*3 to 105*d*3 can face the rear surface of the main frame 103 (see FIG. 23) and can be connected to the other ends of the side walls 105*a*1 to 105*d*1. The second walls 105*a*3 to 105*d*3 can be elongated along the other ends of the side walls 105*a*1 to 105*d*1. The second walls 105*a*3 to 105*d*3 may be referred to as rear walls 105*a*3 to 105*d*3 or back walls 105*a*3 to 105*d*3.

One ends of the second walls 105*a*3 to 105*d*3 can be connected to the other ends of the sidewalls 105*a*1 to 105*d*1. The other ends of the second walls 105*a*3 to 105*d*3 can be spaced apart from the other ends of the sidewalls 105*a*1 to 105*d*1.

The length of the one end of the second walls 105*a*3 to 105*d*3 can be longer than the length of the other end of the second walls 105*a*3 to 105*d*3. For example, the second walls 105*a*3 to 105*d*3 can be in the form of a trapezoid.

The sidewalls 105*a*1 to 105*d*1, the front walls 105*a*2 to 105*d*2 and the rear walls 105*a*3 to 105*d*3 can be applied to the first piece 105*a* to the fourth piece 105*d*, respectively.

The guide panel 117 (see FIG. 18), the backlight unit 120 (see FIG. 2), and the main frame 130 (see FIG. 2) are provided between the front walls 105*a*2 to 105*d*2 and the rear walls 105*a*3 to 105*d*3.

Figure 10A:
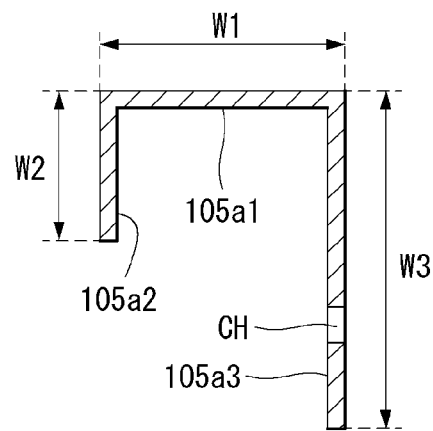

Referring to FIG. 10A, the first piece 105*a* of the front cover 105 can include a sidewall 105*a*1, a front wall 105*a*2, and a rear wall 105*a*3.

The sidewall 105*a*1 can be connected with the front wall 105*a*2 and the rear wall 105*a*3 (e.g., the sidewall 105*a*1 is between the front wall 105*a*2 and the rear wall 105*a*3).

The side wall 105*a*1, the front wall 105*a*2, and the rear wall 105*a*3 can have a predetermined length or width.

The side wall 105*a*1 can have a first width W1 and the front wall 105*a*2 can have a second width W2 and the rear wall 105*a*3 can have a third width W3.

The first width W1 can be a width measured between one end and the other end of the side wall 105*a*1. The second width W2 can be a width measured between one end and the other end of the front wall 105*a*2. The third width W3 can be a width measured between one end and the other end of the rear wall 105*a*3.

The first width W1 can be equal to or shorter than the third width W3. The first width W1 can cover the display panel 110 (see FIG. 1), the guide panel 117 (see FIG. 23), the backlight unit 120 (see FIG. 2) and the main frame 130. The thickness of the display device 100 (see FIG. 1) can be minimized.

The second width W2 can be shorter than the first width W1 and the third width W3. The second width W2 can be a minimum width that not only is facing the front surface of the display panel 110 (see FIG. 1) but also is not overlapping the displayed image.

The third width W3 can be longer than the second width W2. The third width W3 can be the minimum width which the front cover 105 can stably be fastened to the back surface of the main frame 130 (see FIG. 23).

Figure 10B:
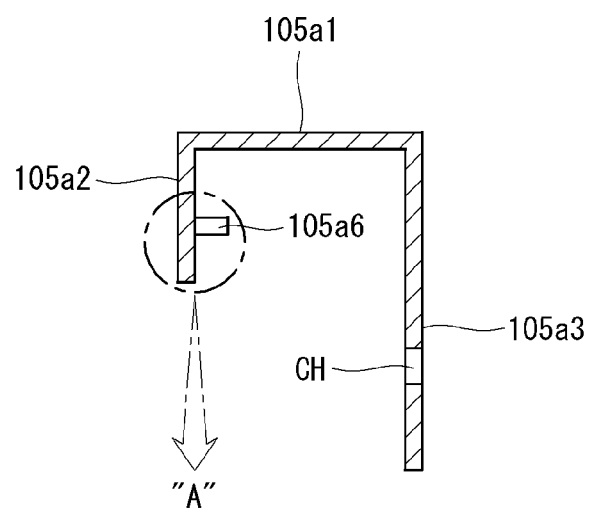
Figure 10C:
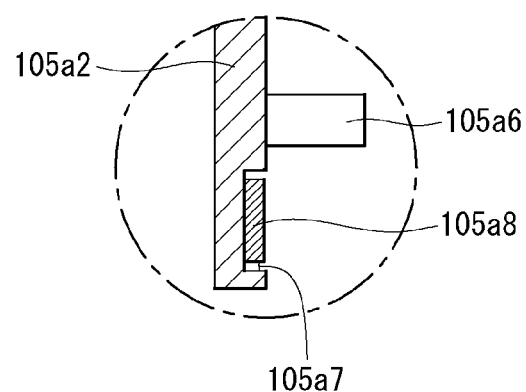

Referring to FIGS. 10B and 10C, the inner surface of the front wall 105a2 can face the inner surface of the rear wall 105a3.

The inner surface of the front wall 105a2 can include at least one protruding member 105a6 and a buffer member 105a8.

The protruding member 105a6 can protrude from the inner surface of the front wall 105a2. The protruding member 105a6 can be disposed between the buffer member 105a8 and one end of the front wall 105a2. The protruding member 105a6 can protrude toward the inner surface of the rear wall 105a3.

The protruding member 105a6 can support or hold the guide panel 117 (see FIG. 23) while the guide panel 117 is fastened or coupled with the front cover 105. The protruding member 105a6 can prevent the front cover 105 from being arbitrarily separate from the display panel 110 (see FIG. 23), the guide panel 117 (see FIG. 23) and the main frame 130 (see FIG. 23).

The buffer member 105a8 can be disposed on the inner surface of the front wall 105a2, away from the protruding member 105a6. The buffer member 105a8 can be disposed between the protruding member 105a6 and the other end of the front wall 105a2. The buffer member 105a8 can be facing or in contact with the front surface of the display panel 110 (see FIG. 23).

The buffer member 105a8 can be disposed in the buffer groove 105a7 formed in the inner surface of the front wall 105a2. The buffer groove 105a7 can have a width or a length that is longer than the width or the length of the buffer member 105a8. The buffer groove 105a7 can have a depth smaller than the thickness of the buffer member 105a8.

The buffer member 105a8 can protect the display panel 110 (see FIG. 23) from the external impact generated on the front surface or the side surface of the display device.

Figure 11:
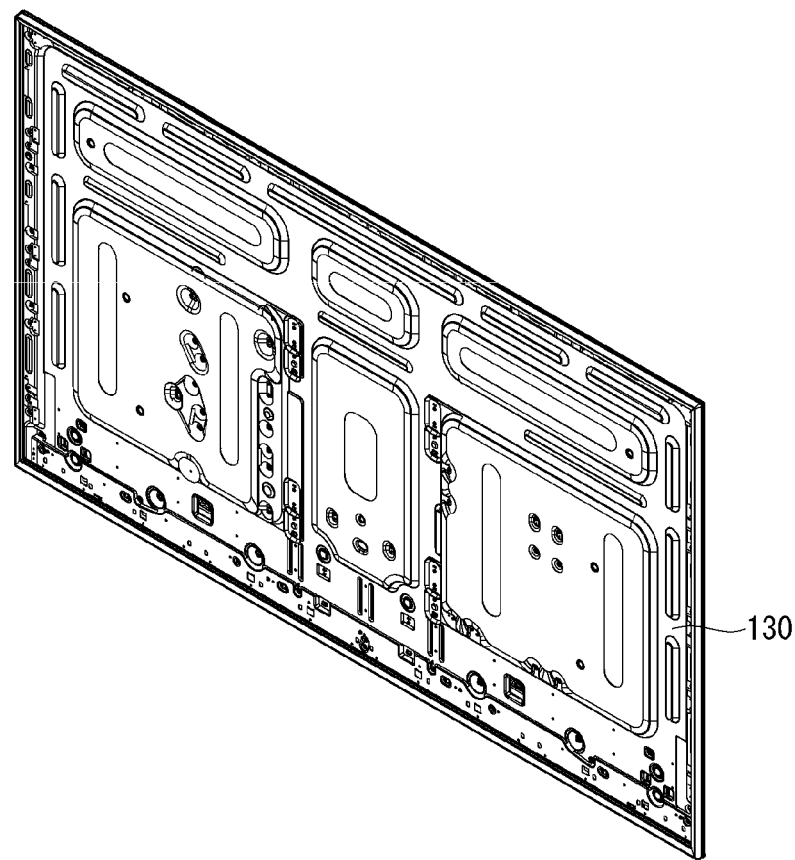
Figure 12:
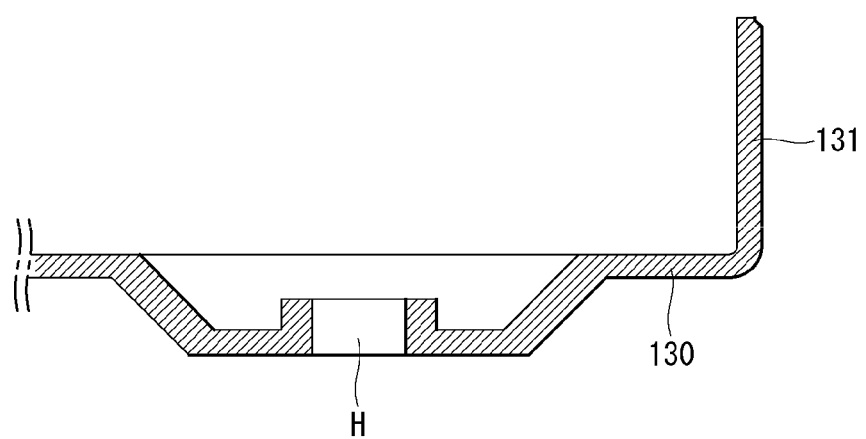

Referring to FIGS. 11 and 12, the main frame 130 can support the components of the display device 100 (see FIG. 1). The main frame 130 may be referred to as a rear cover 130.

The main frame 130 can have a plurality of holes. The plurality of holes can be designed to correspond to the components of the display device 100. The plurality of holes can be combined with the fastening member to fix the components of the display device 100.

The main frame 130 can have a frame wall 131 extending along a periphery of the frame, or an edge of the frame. The frame wall 131 can extend toward the front of the display device 100.

Figure 13:
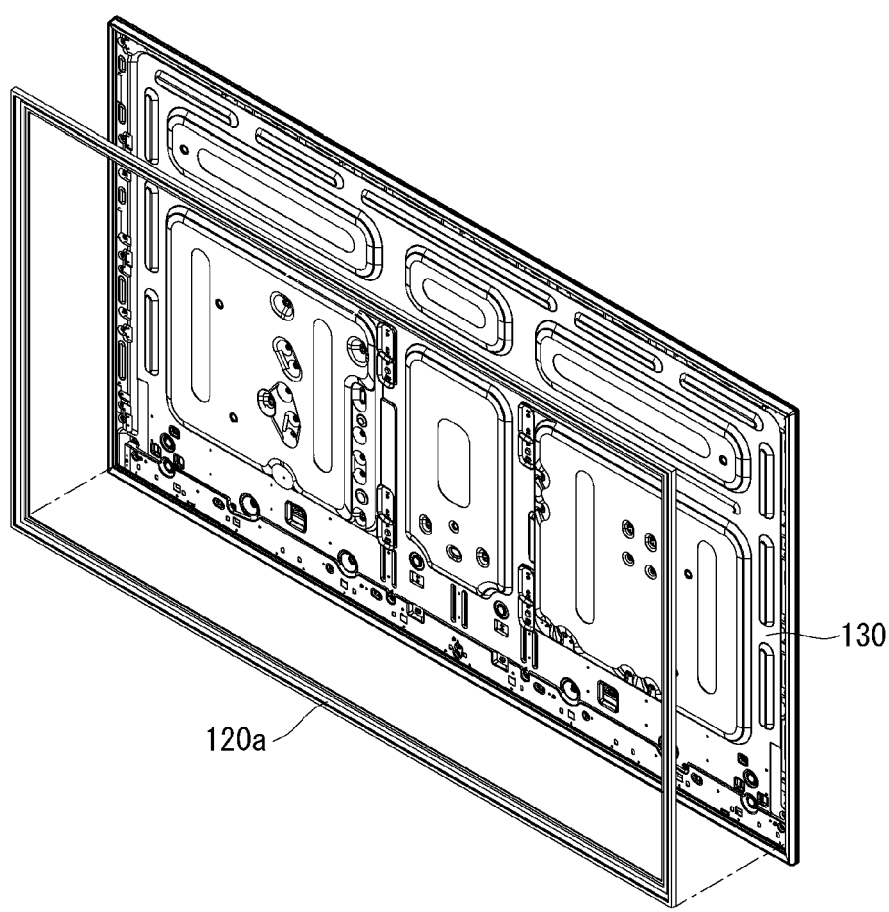
Figure 14:
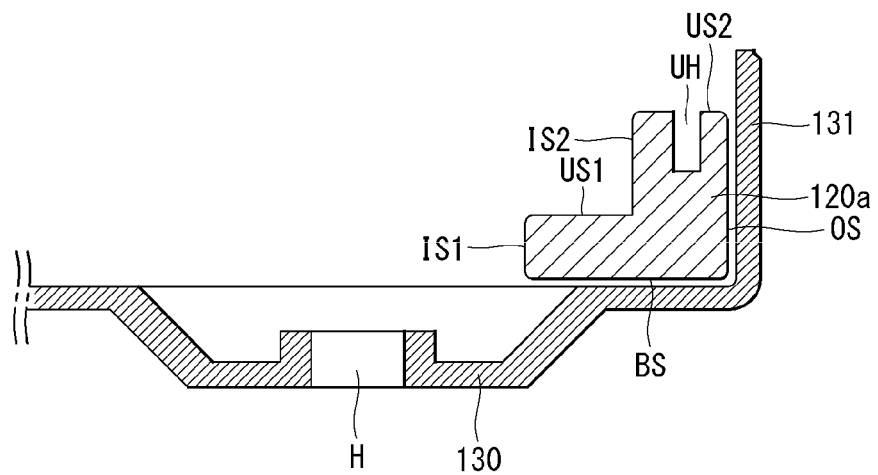

Referring to FIGS. 13 and 14, a holder 120a of the backlight unit 120 can be positioned along a rim or an edge on an inner surface of the main frame 130.

The holder 120a of the backlight unit 120 can be fastened in a top down manner along the rim or edge of the main frame 130. The holder 120a of the backlight unit 120 may be referred to as LGP holder 120a or unit holder 120a.

The holder 120a of the backlight unit 120 can be disposed on the main frame 130 using a fastening member. For example, the fastening member can be a double-sided tape, bolt, screw, adhesive, silicone, or the like.

The holder 120a of the backlight unit 120 can be disposed in contact with the front surface of the main frame 130 or the inner surface of the frame wall 131. The holder 120a of the backlight unit 120 includes an upper surface US1 and US2, a lower surface BS, an inner surfaces IS1 and IS2 and an outer surface OS.

The upper surfaces US1 and US2 of the unit holder 120a can be formed to be stepped. The upper surfaces US1 and US2 of the unit holder 120a can include a first upper surface US1 and a second upper surface US2. The first upper surface US1 can be formed to be lower than the second upper surface US2. The second upper surface US2 can have a unit hole UH.

The lower surface BS can be connected with the inner side surfaces IS1 and the outer side surface OS. The inner surfaces IS1 and IS2 can include a first inner surface IS1 and a second inner surface IS2. The first inner surface IS1 can be disposed between the first upper surface US1 and the lower surface BS. The second inner surface IS2 can be disposed between the first upper surface US1 and the second upper surface US2. The outer surface OS can be disposed between the second upper surface US2 and the lower surface BS.

The unit holder 120a can be elongated along the rim or the edge of the main frame 130, and can be formed as one body. Or the unit holder 120a can be divided into at least one piece or more pieces. For example, the unit holder 120a can include a first holder to a fourth holder. The first holder can be disposed along the first long side of the main frame 130. The second holder can be disposed along the second long side of the main frame 130. The third holder can be disposed along the first short side of the main frame 130. The fourth holder can be disposed along the second short side of the main frame 130.

However, the present invention is not limited thereto, and the holder 120a of the backlight unit 120 can include a first holder and a second holder. The first holder can be disposed along the first long side of the main frame 130. The second holder can be disposed along the second long side of the main frame 130.

Alternatively, the holder 120a of the backlight unit 120 can include a third holder and a fourth holder. The third holder can be disposed along the first short side of the main frame 130. The fourth holder can be disposed along the second short side of the main frame 130.

Figure 15:
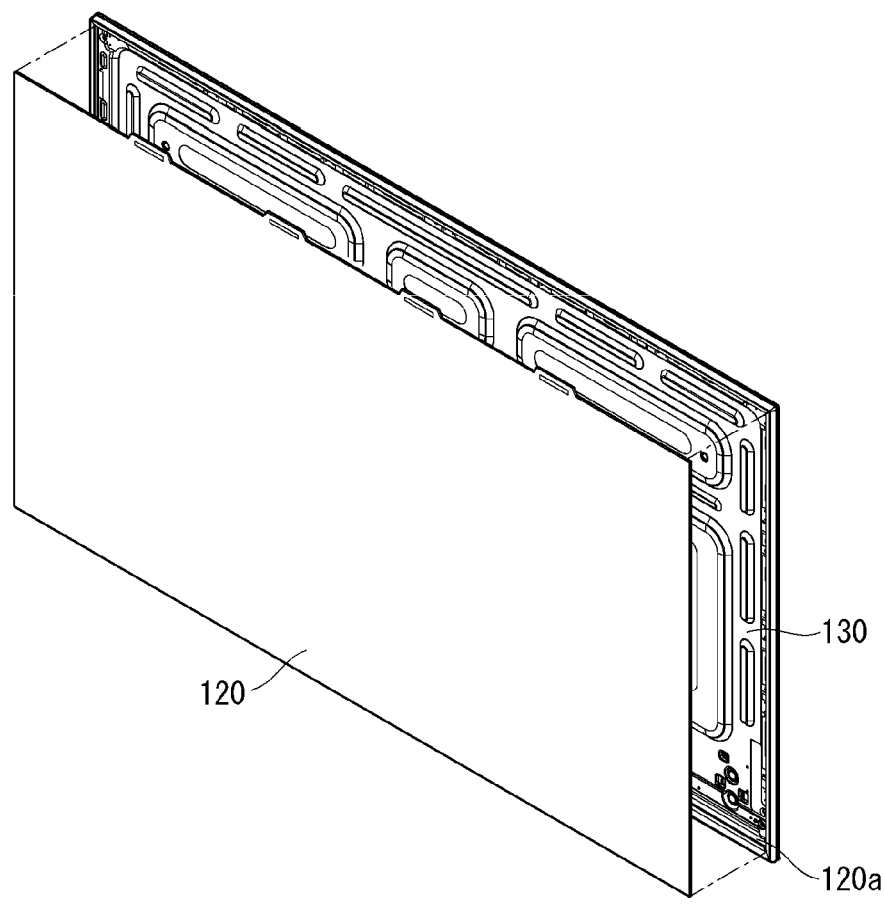
Figure 16:
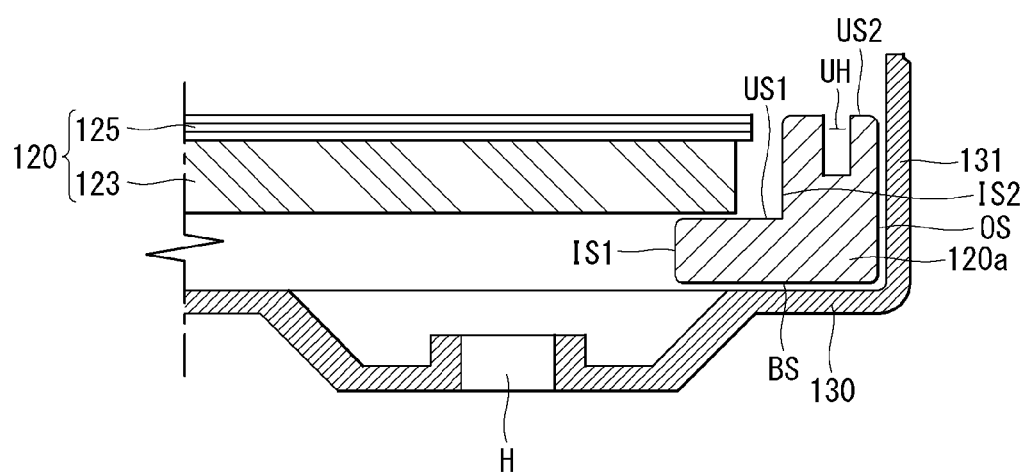

Referring to FIGS. 15 and 16, the optical assembly 123 and the optical sheet 125 can be disposed in front of the main frame 130.

The optical assembly 123 and the optical sheet 125 can be spaced apart from the front surface of the main frame 130 and can contact the unit holder 120a. The optical assembly 123 and the edge or rim of the optical sheet 125 sits the first upper surface US1 of the unit holder 120a and can be spaced apart from the second inner surface IS2.

Figure 17:
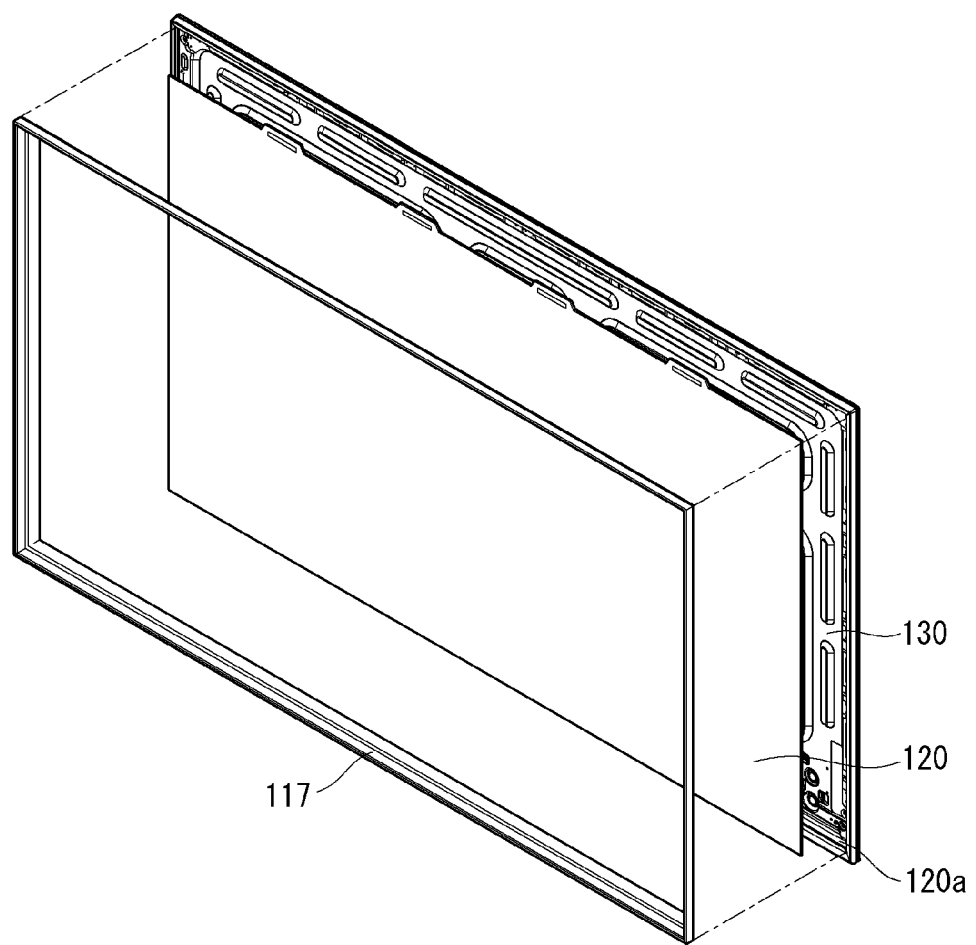
Figure 18:
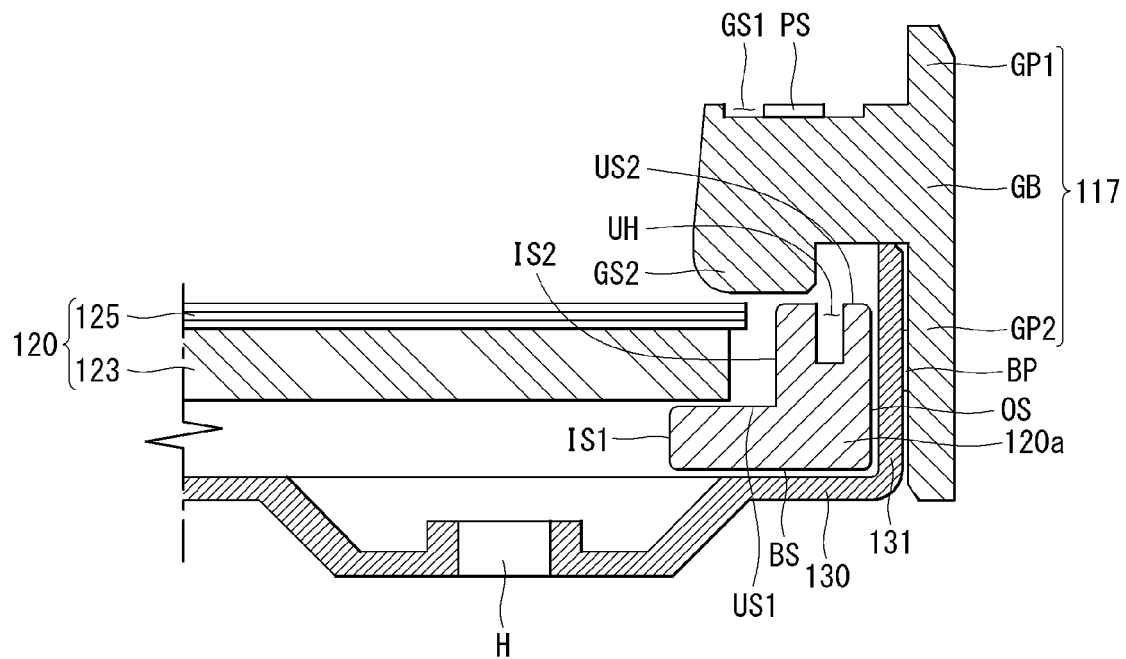

Referring to FIGS. 17 and 18, the guide panel 117 can be coupled to the main frame 130 in a top-down manner. The guide panel 117 can be fastened or mounted to the upper part of the frame wall 131.

The guide panel 117 can include a guide body GB, first and second guide protrusions GP1 and GP2, and first and second guide seating portions GS1 and GS2.

The guide body GB can be separated from the optical sheet 125 while being in contact with the top of the frame wall 131.

The first and second guide protrusions GP1 and GP2 can be extended from the guide body GB. The guide protrusions GP1 and GP2 can protrude forward and backward of the display device 100 (see FIG. 1). The guide protrusions GP1 and GP2 can include a first guide protrusion GP1 and a second guide protrusion GP2.

The first guide protrusion GP1 can protrude from the upper surface of the guide body GB toward the front of the display device 100 (see FIG. 1).

The second guide protrusion GP2 can protrude from the lower surface of the guide body GB toward the rear of the display device 100 (see FIG. 1). The second guide protrusion GP2 can be in contact with the outer surface of the frame wall 131.

Alternatively, the second guide protrusion GP2 can be spaced apart from the outer surface of the frame wall 131 by a predetermined distance. A buffer member BP can be disposed between the second guide protrusion GP2 and the outer surface of the frame wall 131.

The buffer member BP is disposed between the outer surface of the frame wall 131 and the second guide protrusion GP2 to buffer or alleviate an impact applied from the outside of the display device.

The guide seating portions GS1 and GS2 can be disposed inside the guide body GB. The guide seating portions GS1 and GS2 can include a first guide seating portion GS1 and a second guide seating portion GS2.

The first guide seating portion GS1 can be spaced apart from the first guide protrusion GP1 and disposed on the upper surface of the guide body GB. The first guide seating portion GS1 can be concaved or depressed toward the rear of the display device 100 (see FIG. 1).

The first guide seating portion GS1 can include a panel seating member PS. The panel seating member PS can buffer or alleviate the impact externally applied. The panel seating member PS can be in contact with the rear surface or the back surface of the display panel 110 (see FIG. 23) to be described later. The panel seating member PS can comprise a resilient material.

The second guide seating portion GS2 can be spaced apart from the second guide protrusion GP2 and protrude from the lower surface of the guide body GB toward the rear of the display device 100 (see FIG. 1). The second guide seating portion GS2 can have a lower height than a height the second guide protrusion GP2 and can contact the optical sheet 125 or the optical assembly 123.

Figure 19:
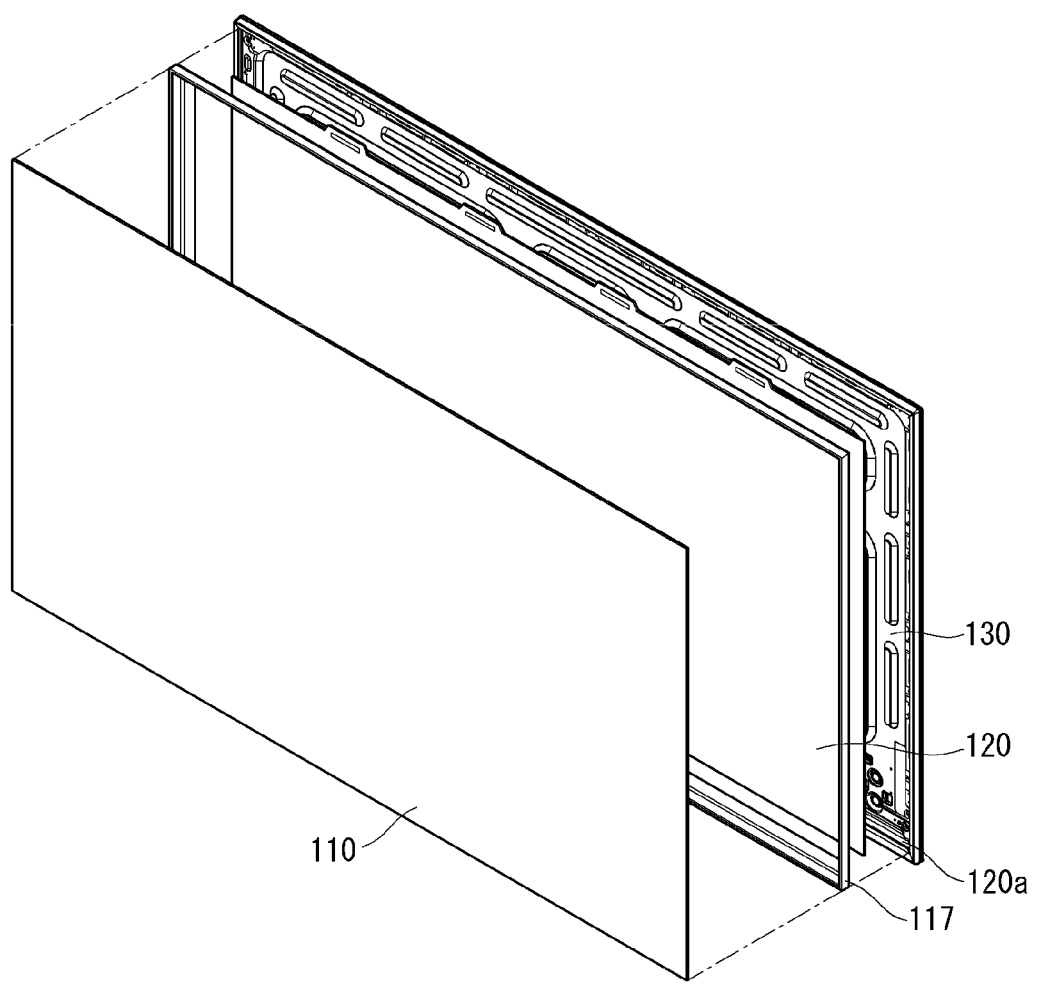
Figure 20:
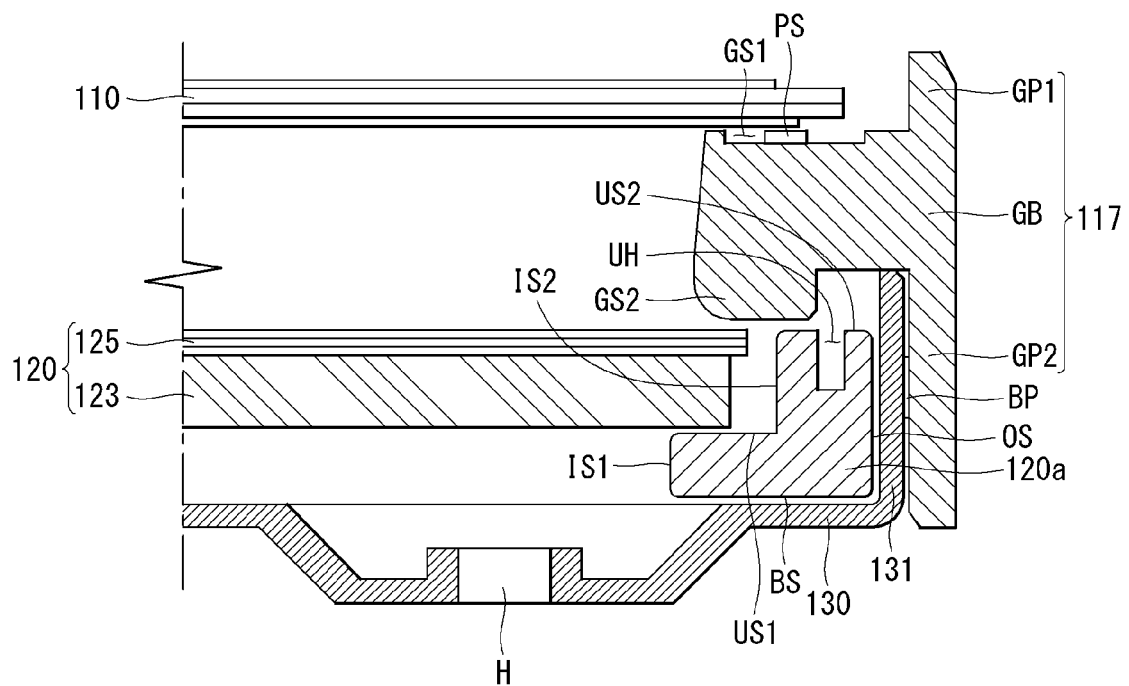

Referring to FIGS. 19 and 20, the display panel 110 (see FIG. 23) can be seated or fixed or fastened to the guide panel 117. The rear surface or back surface of the display panel 110 (see FIG. 23) can be in contact with the panel seating member PS of the guide panel 117.

The lower portion of the display panel 110 (see FIG. 1) can be electrically connected to at least one pad portion. The pad portion can be electrically connected to a panel driver PD mounted or embedded in the back surface of the main frame 130.

Figure 21:
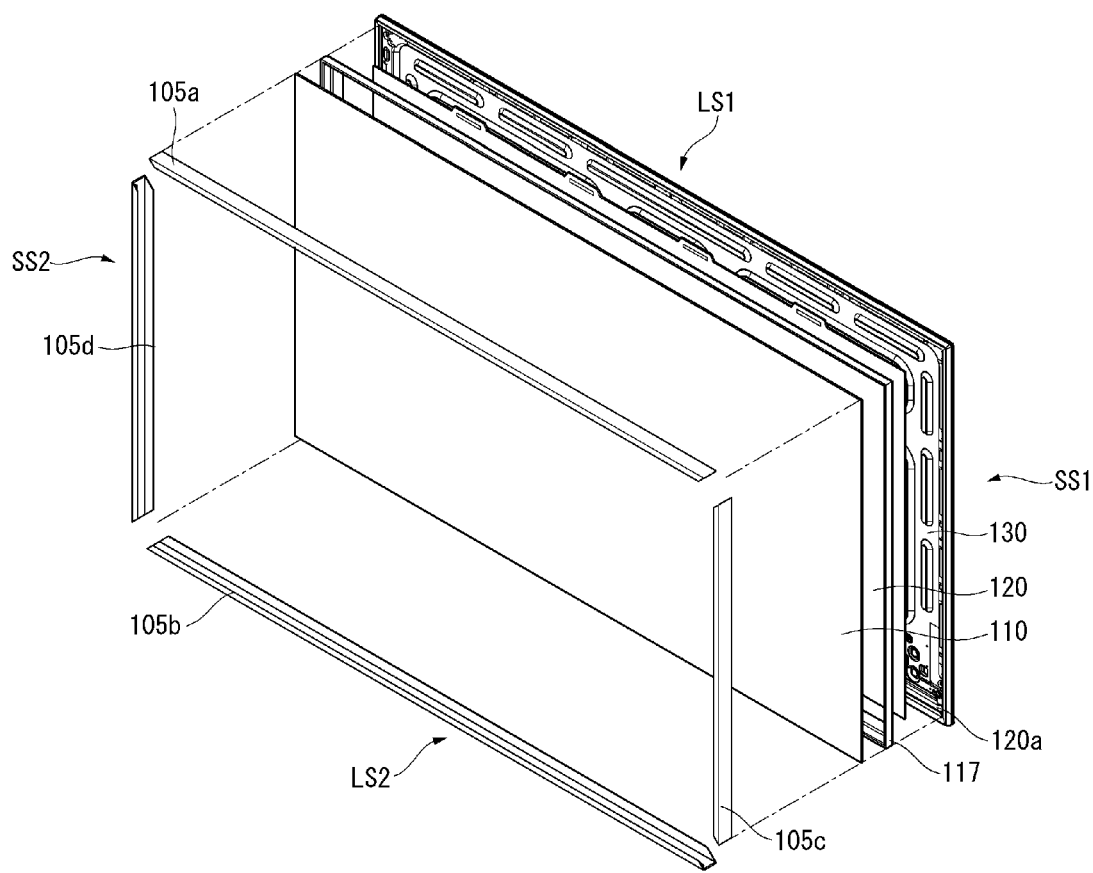
Figure 22:
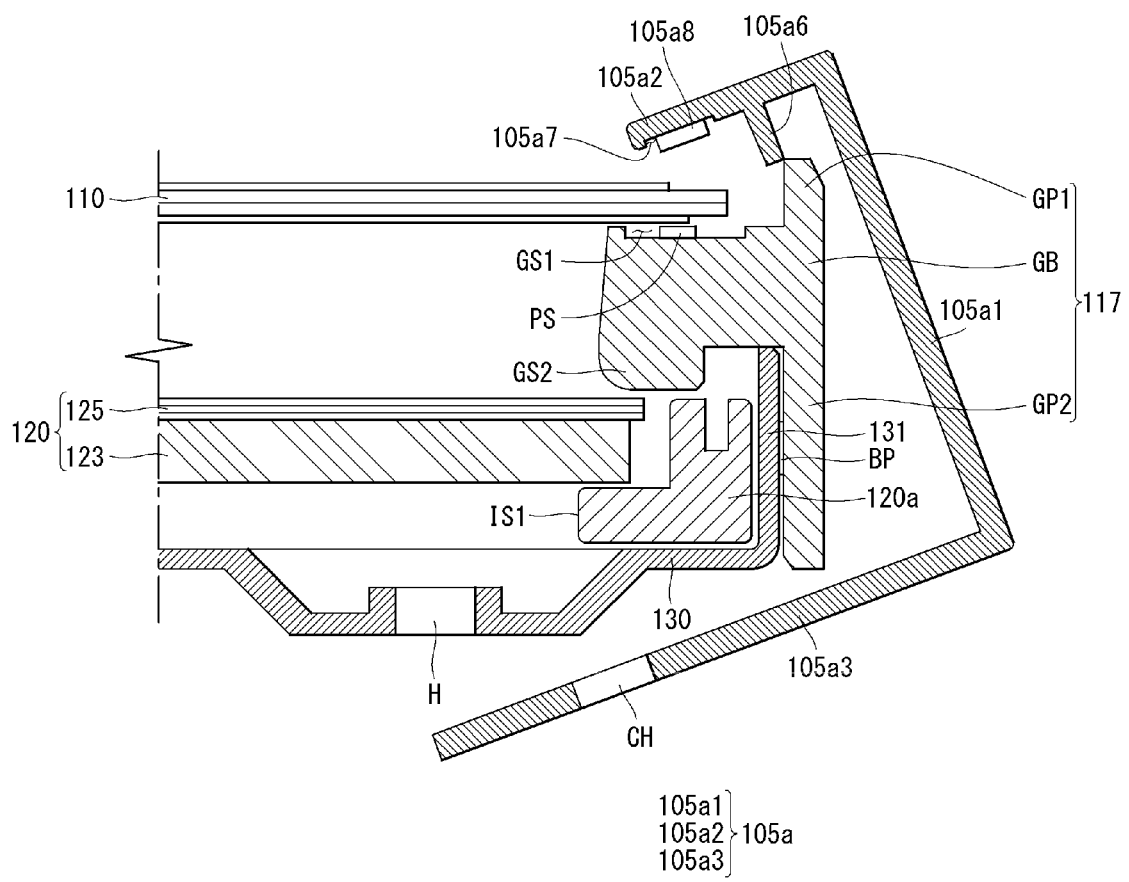

Referring to FIGS. 21 to 23, the front cover 105 can be inserted into four sides of the main frame 130 to be coupled with the guide panel 117 and the main frame 130. The front cover 105 can include a first piece 105a to a fourth piece 105d.

The first piece 105a can be coupled at the first long side LS1 with the guide panel 117 and the main frame 130. The third piece 105c can be coupled at the first short side SS1 with the guide panel 117 and the main frame 130. The second piece 105b can be coupled at the second long side LS2 with the guide panel 117 and the main frame 130. The fourth piece 105d can be coupled at the second short side SS2 side with guide panel 117 and the main frame 130.

The front cover 105 can be inserted into four sides of the main frame 130 in a clockwise or counterclockwise direction from the first piece 105a to the fourth piece 105d.

That is, the front cover 105 can be assembled by inserting the sides of the main frame 130 instead of the top-down manner. The front cover 105 can approach the display panel 110 (see FIG. 22) and the main frame 130 in a diagonal or horizontal direction (e.g., the front cover can be slid or clipped on at an angle).

When the front wall 105a2 or the protruding member 105a6 is adjacent to the front surface of the display panel 110 (see FIG. 1), the front cover 105 the rear wall 105a3 of the front cover 105 can move toward the rear surface of the main frame 130 by pushing force (e.g., the front cover can be clipped in and rotated so the rear wall turns toward the main frame).

The front wall 105a2 of the front cover 105 can face the display panel 110 (see FIG. 1). The rear wall 105a3 of the front cover 105 can face the back surface of the main frame 130.

A part of the inner surface of the front wall 105a2 can abut the first guide protrusion GP1.

A part of the inner surface of the rear wall 105a3 can be in contact with the back surface of the main frame 130.

The inner surface of the sidewall 105a1 can face the outer surface of the guide panel 117.

The front cover 105 can be coupled with the main frame 130 to cover the front surface of the display panel 110 (see FIG. 1), the rear surface of the main frame 130, the side of the guide panel 117, and the side of the main frame 130.

When the front cover 105 is inserted into and assembled with the main frame 130, the fastening member S passes through the holes H of the rear wall 105a3 to fix the front cover 105 to the main frame 130.

Figure 24:
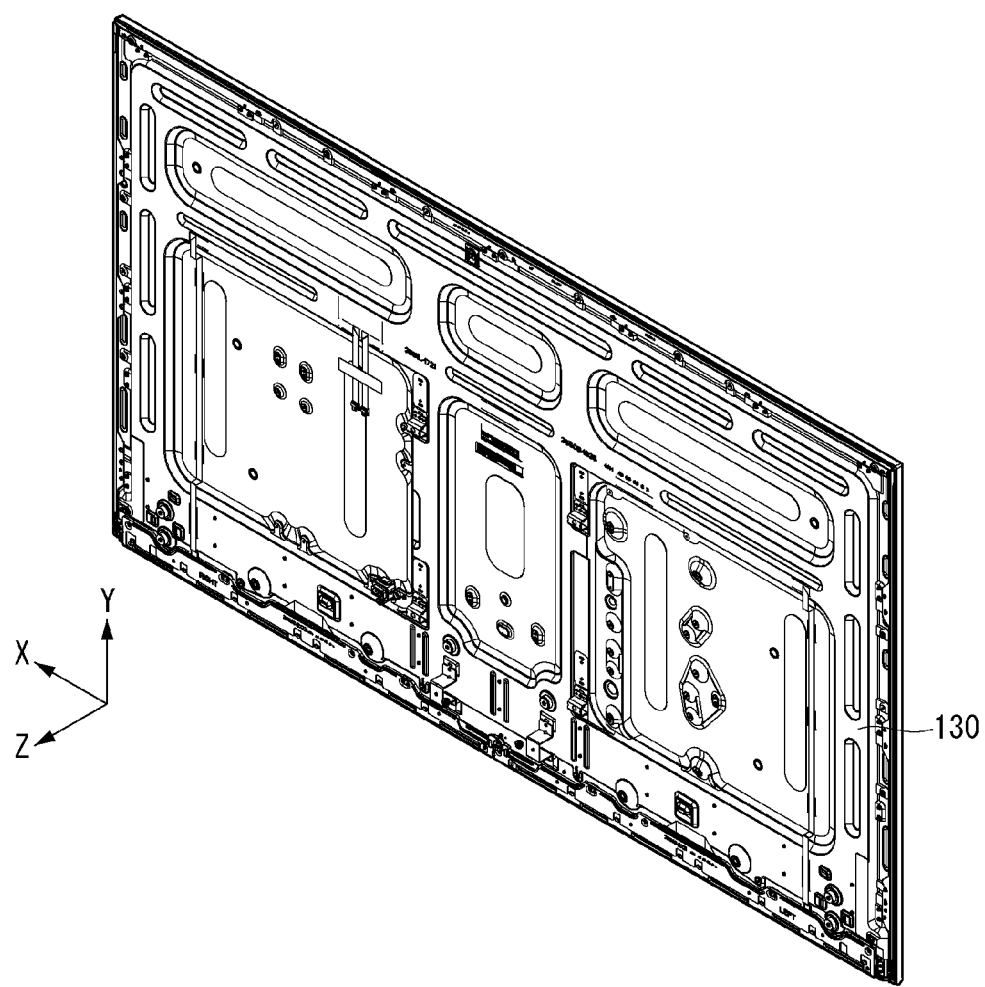
Figure 25:
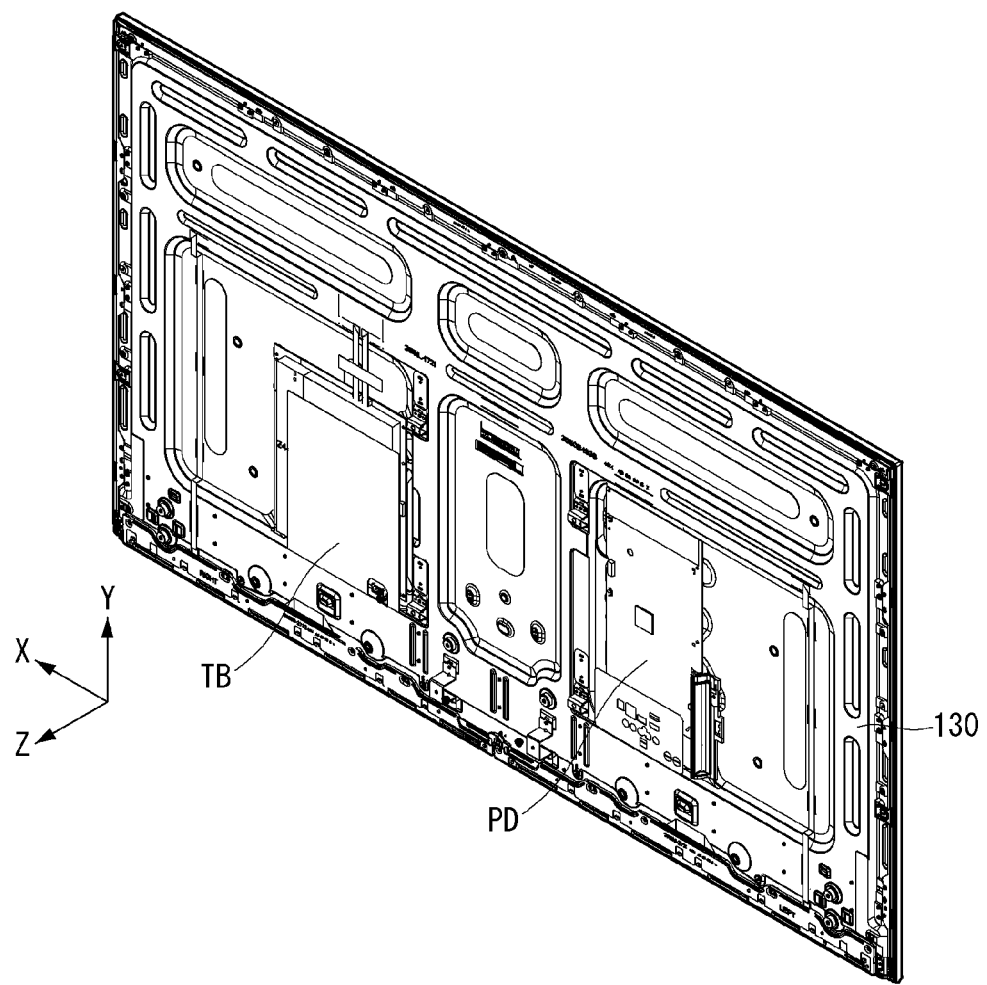

Referring to FIGS. 24 and 25, when the front cover 105 is fastened to the main frame 130, the main frame 130 can be reversed (e.g., turned around). A source shield can be mounted on the rear surface of the main frame 130. The T-con board TB and the panel driver PD can be mounted on the rear or back surface of the main frame 130.

The T-con board TB can be electrically connected to the panel driver PD through a flexible flat cable (FFC). The panel driver PD can be mounted with at least one circuit or semiconductor device and can supply a driving signal to the display panel 110 (see FIG. 1) capable of driving the display panel 110 (see FIG. 1). The T-con board TB can be referred to as a main controller.

Before the display device 100 (see FIG. 1) is coupled with the back cover 150 (see FIG. 26), aging and various inspection may proceed.

Figure 26:
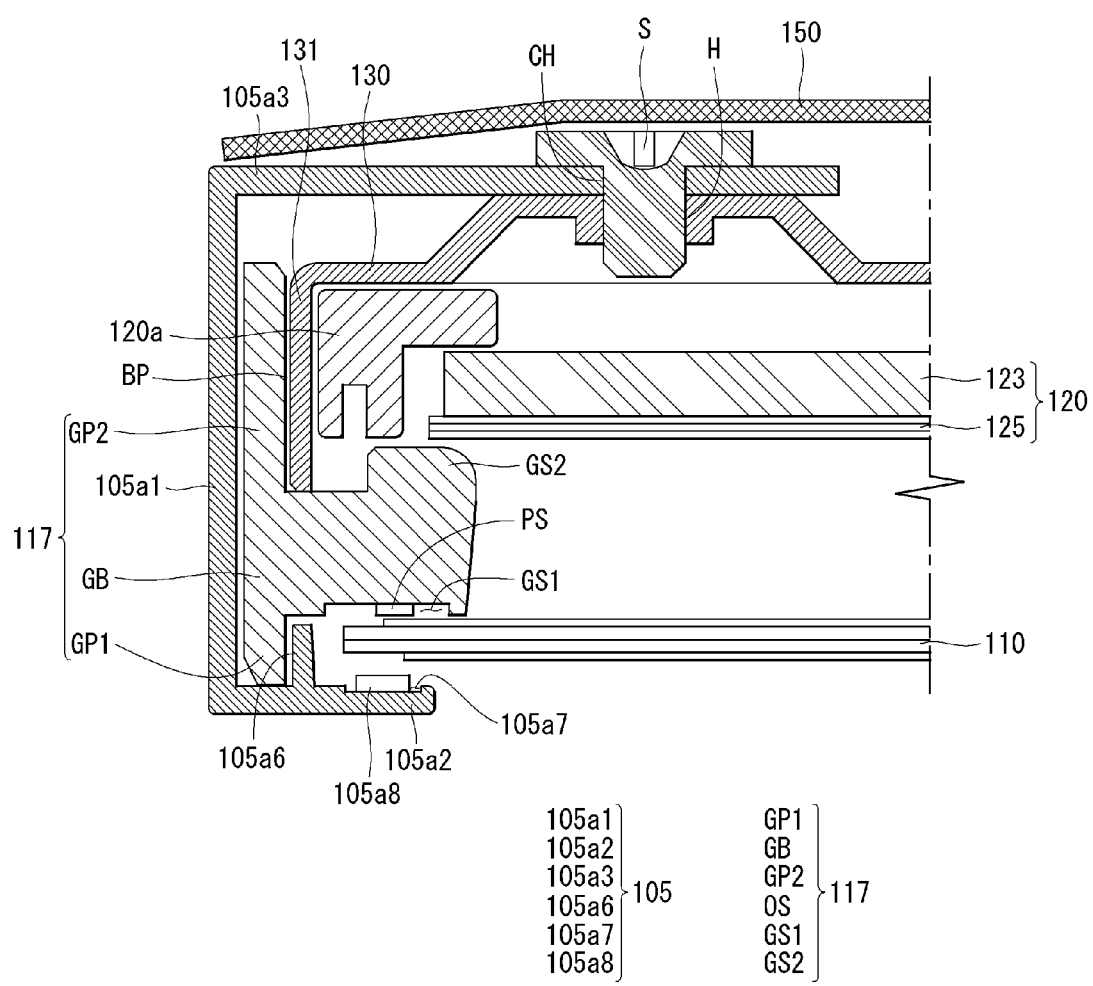

Referring to FIG. 26, after a display device 100 (see FIG. 1) has completed aging and various tests, the back cover 150 can be coupled with the main frame 130 at the back surface of the main frame 130. According to this embodiment, when the front cover is one rectangular piece, it is preferable that the front cover is attached manually, in order to avoid breakage (e.g., FIG. 22). Alternatively, the front cover can be divided into four separate pieces which can be attached with an automated process, thus requiring additional steps (e.g., FIG. 8).

Figure 27:
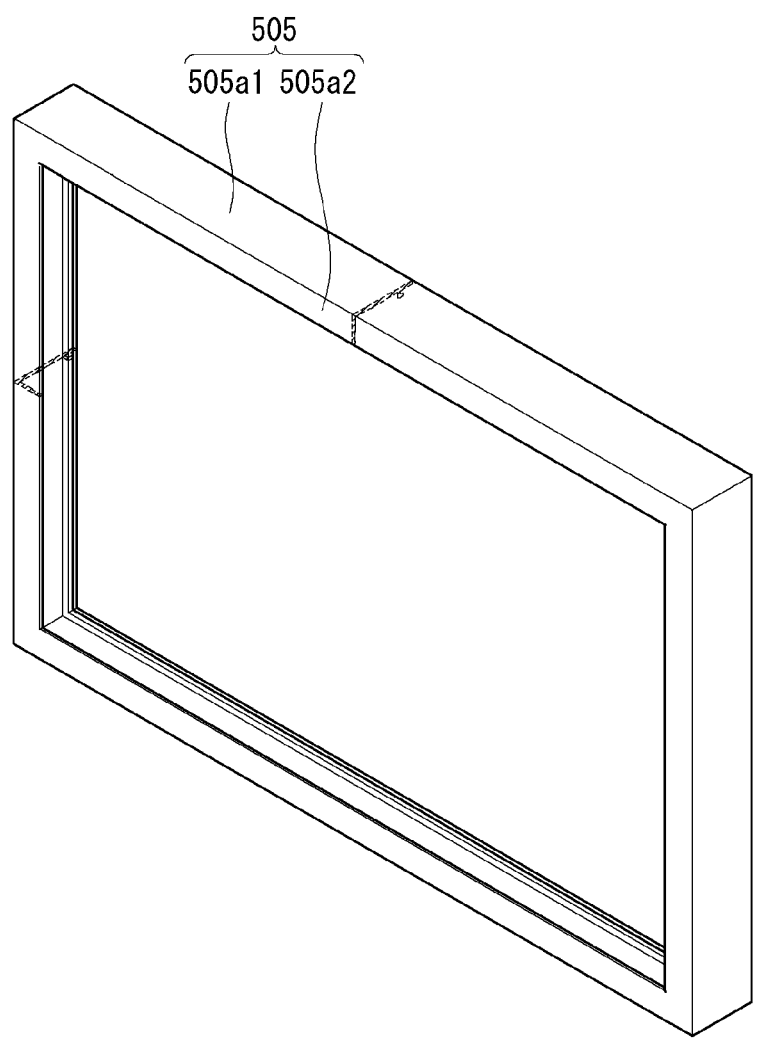

Referring to FIG. 27, the front cover 505 can cover the display panel 110 (see FIG. 40) and the main frame 130. The front cover 505 can be formed to surround the side of the display panel 110 (see FIG. 40) and the side of the main frame 130 and can be exposed to the outside of the display device.

The front cover 505 can be formed in one body or picture frame shape.

The front cover 505 can include a sidewall 505a1 and a front wall 505a2.

The side wall 505a1 can be connected to the front wall 505a2.

The side wall 505a1 can cover one side of the display panel 110 (see FIG. 40) and one side of the main frame 130. The side wall 505a1 can have a rectangular shape or be a plate elongated in the vertical direction of the display device. The side wall 505a1 can have a width extending in the thickness direction.

The inner surface of the sidewall 505a1 can be spaced away from the outer surface of the guide panel 117. The outer surface of the sidewall 505a1 can be exposed to the outside of the display device (see FIG. 40).

The side wall 505a1 can be provided with a hook 505a3. The hook 505a3 can be disposed on the inner surface of the side wall 505a1.

The front wall 505a2 can face the front surface of the display panel 110 (see FIG. 40) and can be connected to one end of the side wall 505a1. The front wall 505a2 can be extended along the one end of the sidewall 505a1. The front wall 505a2 can be referred to as a first wall 505a2.

One end of the front wall 505a2 can be connected to the one end of the side wall 505a1. The other end of the front wall 505a2 can be spaced apart from the one end of the sidewall 505a1.

Figure 28A:
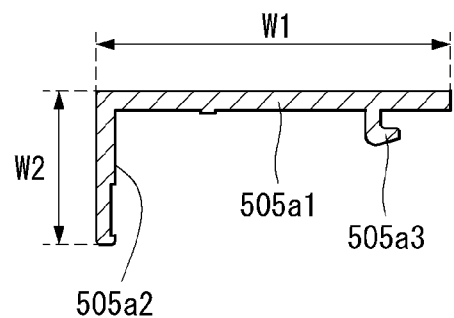

Referring to FIG. 28A, the front cover 505 can include a sidewall 505a1 and a front wall 505a2.

The sidewall 505a1 can be connected with the front wall 505a2 and the hook 505a3.

The sidewall 505a1 and the front wall 505a2 can have a predetermined a length or a width.

The sidewall 505a1 can have a first length W1 and the front wall 505a2 can have a second length W2.

The first length W1 can be a distance between one end and the other end of the sidewall 505a1. The second length W2 can be a distance between one end and the other end of the front wall 505a2.

The first length W1 can be longer than the second length W2. The first length W1 covers all of the display panel 110 (see FIG. 40), the guide panel 117, the backlight unit 120 and at least a side part of the main frame 130. The second length W2 can be a minimum length that faces the front surface of the display panel 110 (see FIG. 40) with not overlapping images displayed on the display panel 110.

Figure 28B:
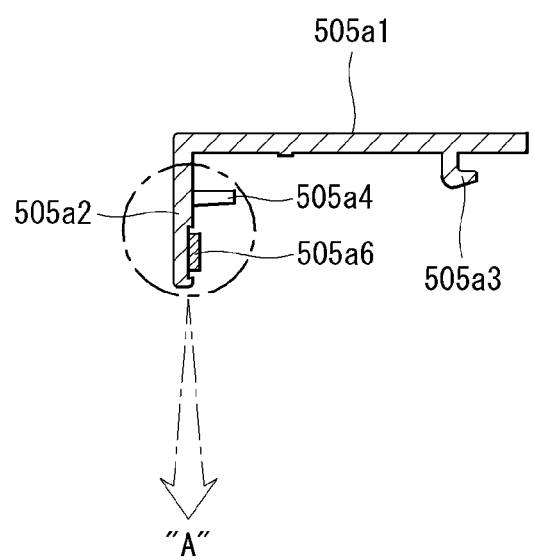
Figure 28C:
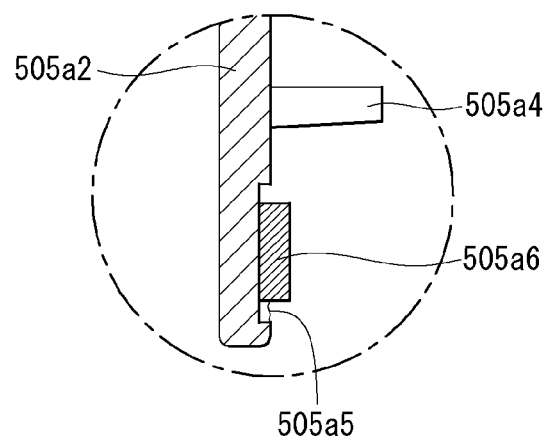

Referring to FIGS. 28B and 28C, the side wall 505a1 can be provided with a hook 505a3. The hook 505a3 can be disposed on the inner surface of the sidewall 505a1. The hook 505a3 can be disposed near a distal end of the side wall 505a1.

The hook 505a3 can be extended from the inner surface of the side wall 505a1 and then be bent toward the rearward direction of the display device. The hook 505a3 can be in contact with a part of the frame wall 131, and the guide panel 117 (see FIG. 40).

Figure 40:
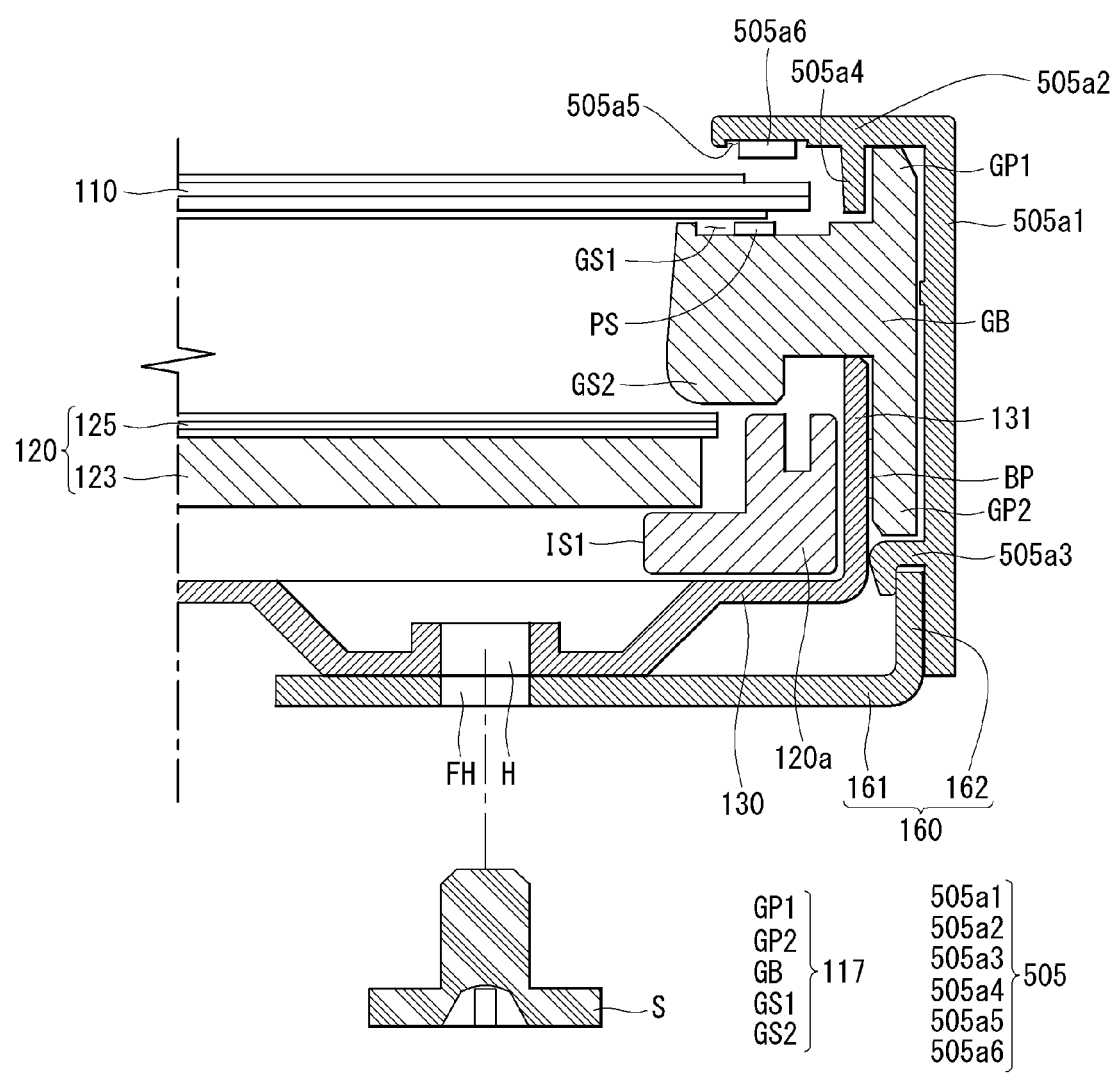
Figure 41:
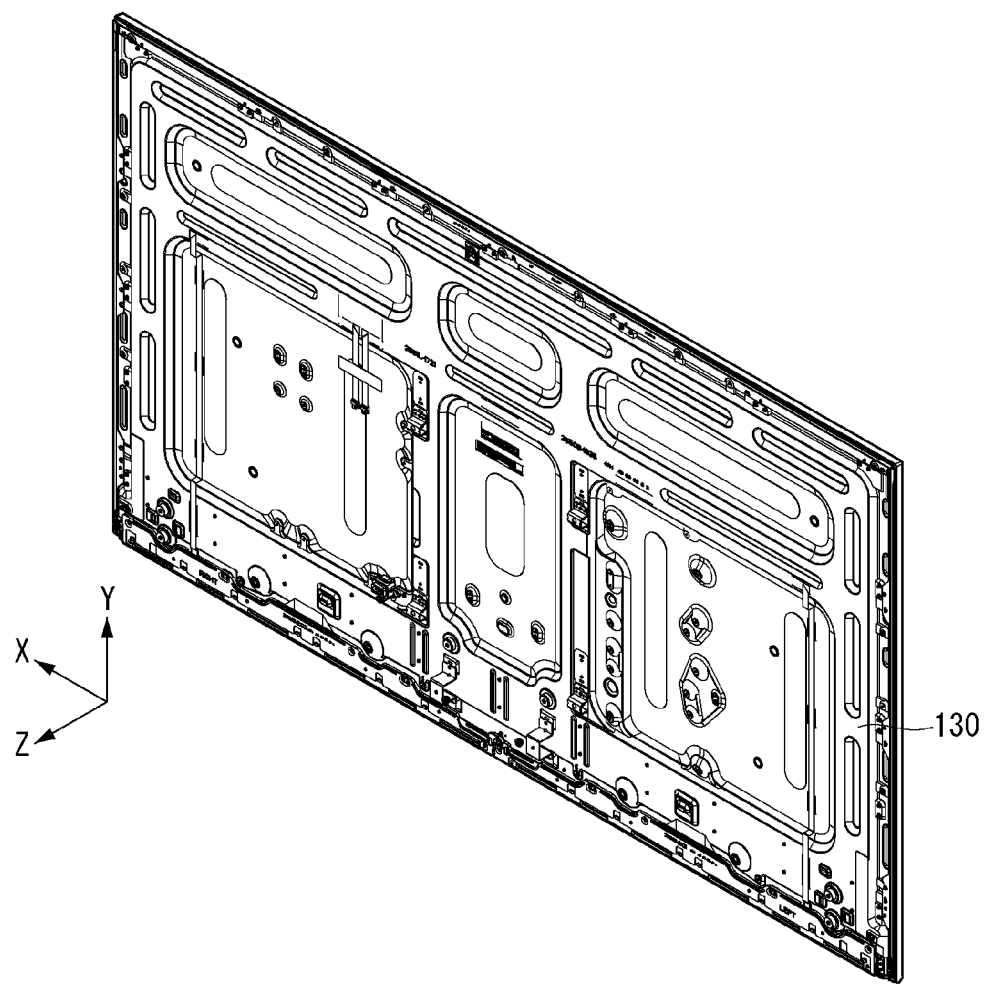
Figure 42:
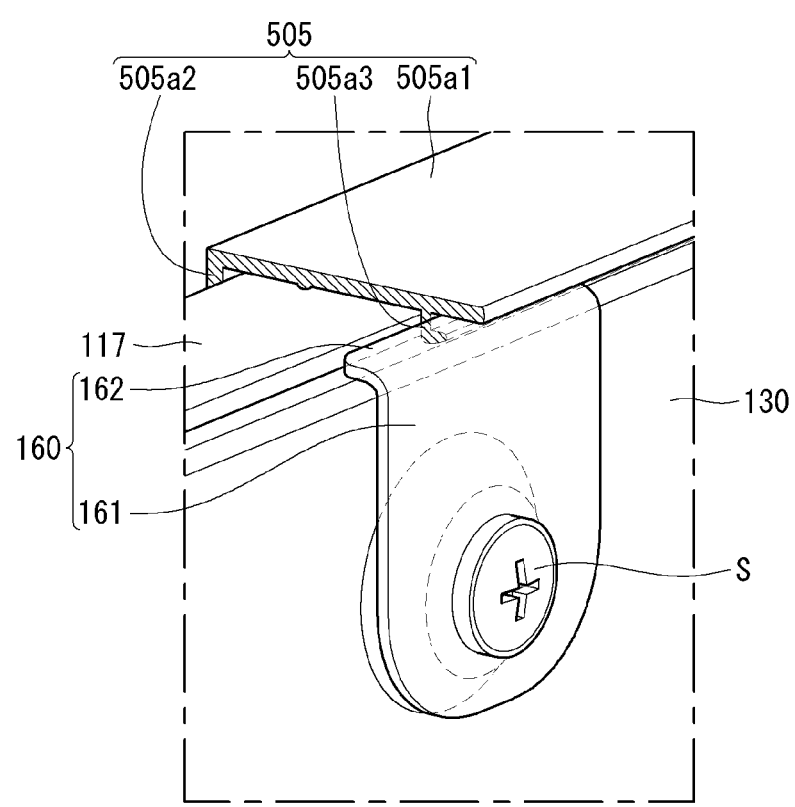
Figure 43:
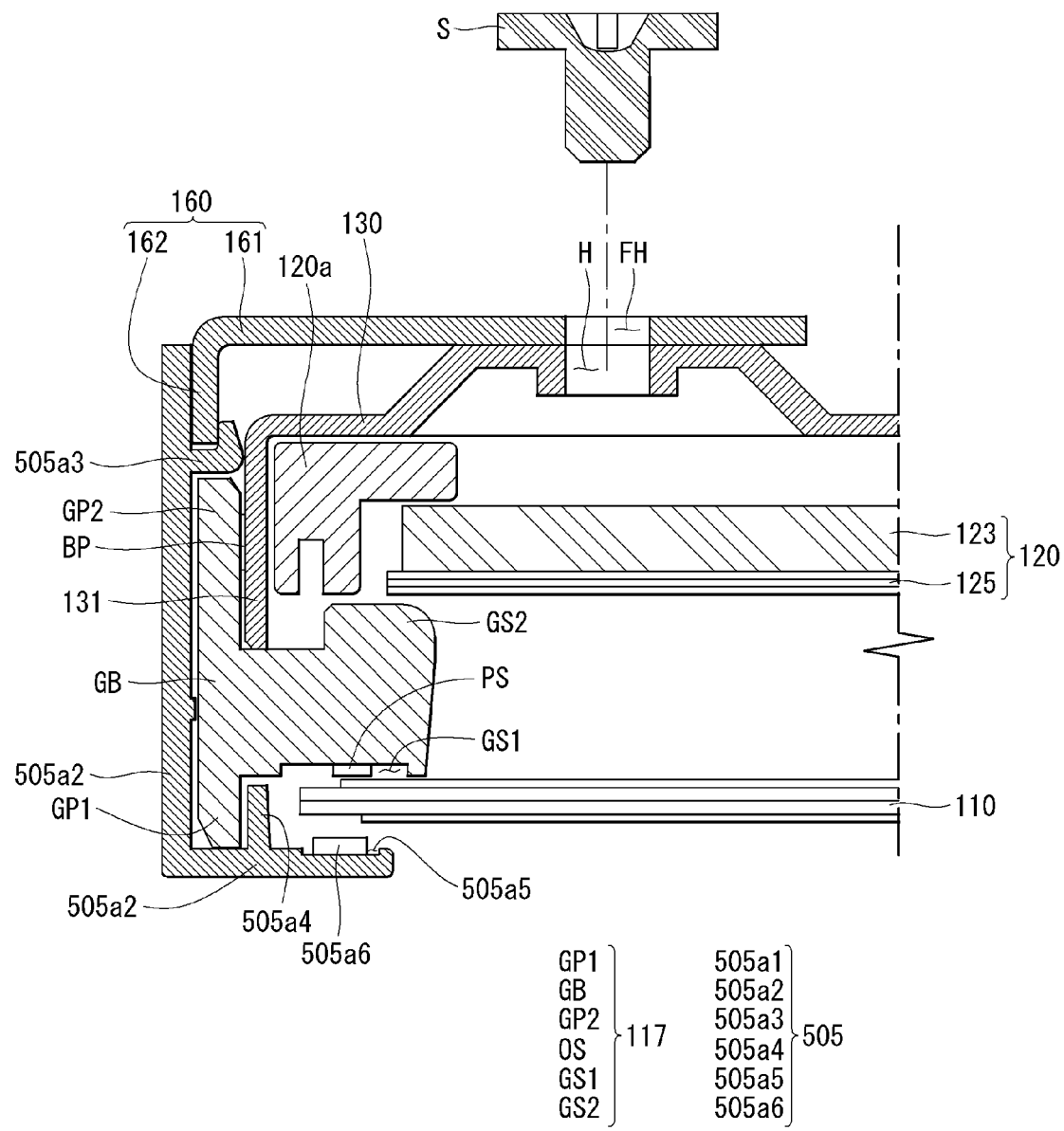

The hook 505a3 can be fastened or coupled with a fixer 160 (see FIG. 40).

The inner surface of the front wall 505a2 can include at least one protruding member 505a4, a buffer member 505a6 and a buffer groove 505a5. Since the protruding member 505a4, the buffer member 505a6 and the buffer groove 505a5 have been described with reference to FIGS. 10B and 10B, they will be omitted.

Figure 29:
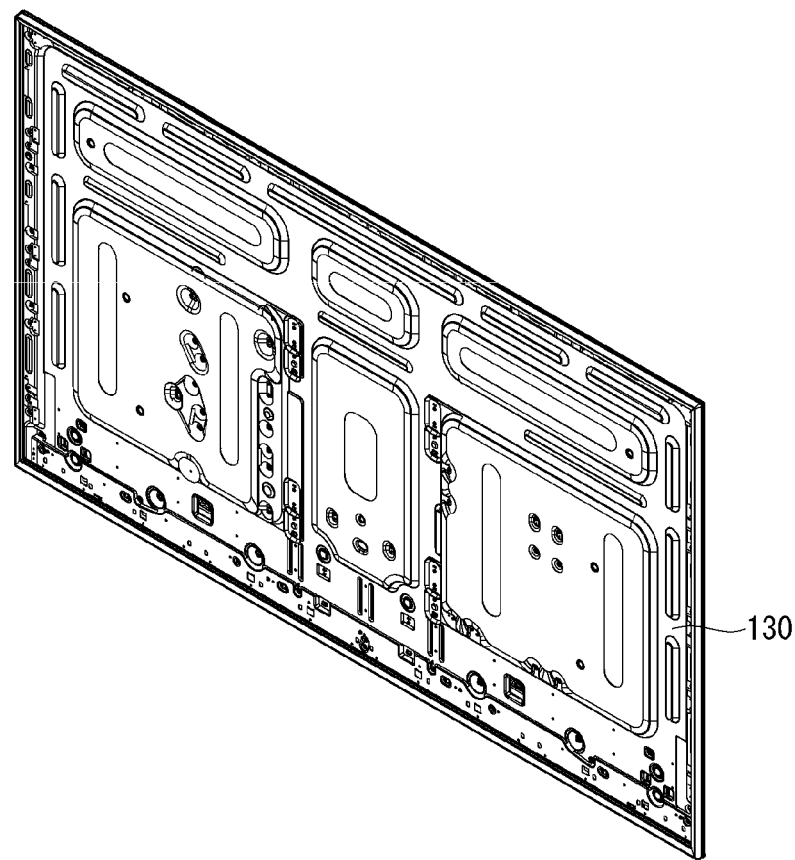
Figure 30:
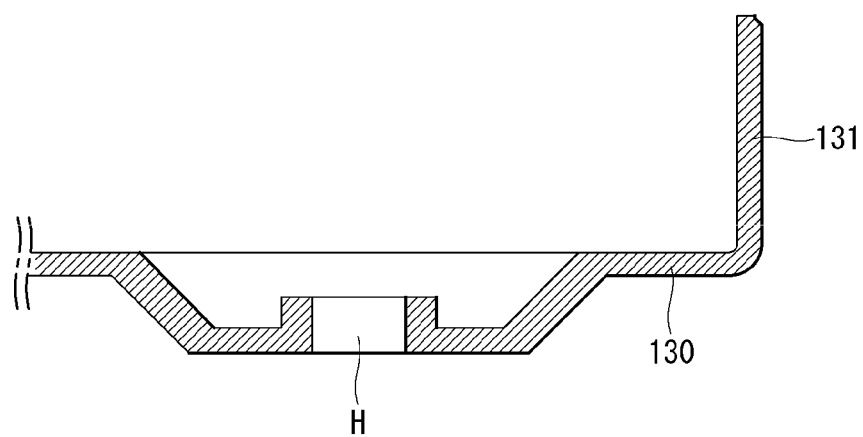
Figure 31:
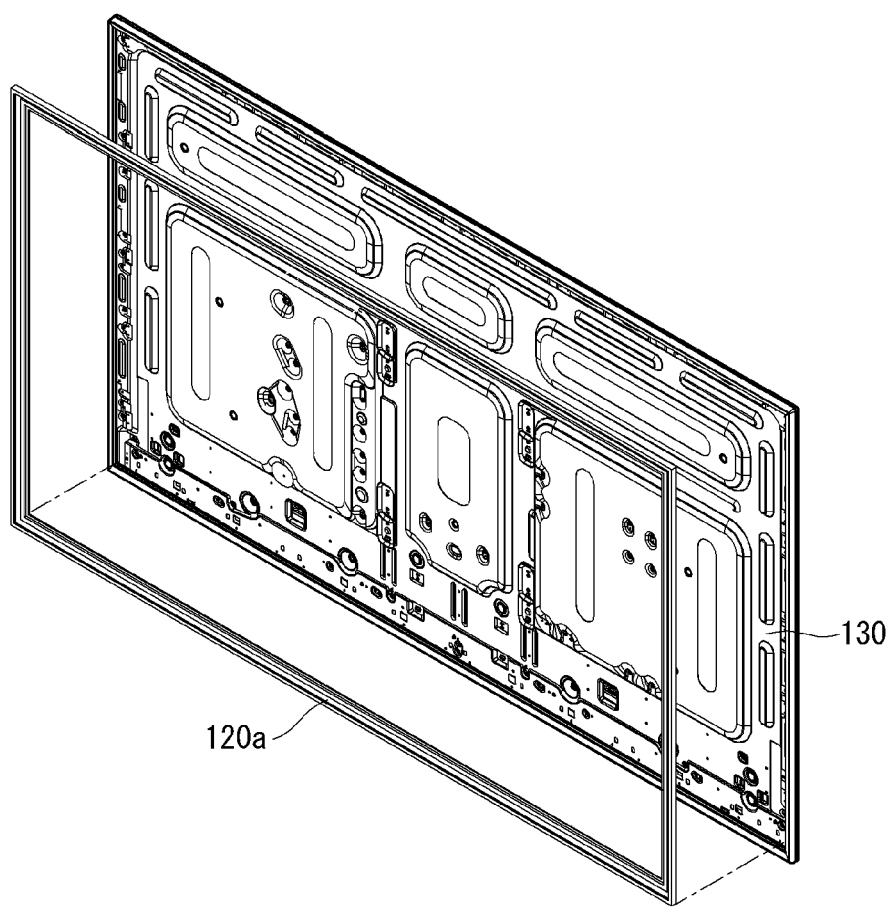
Figure 32:
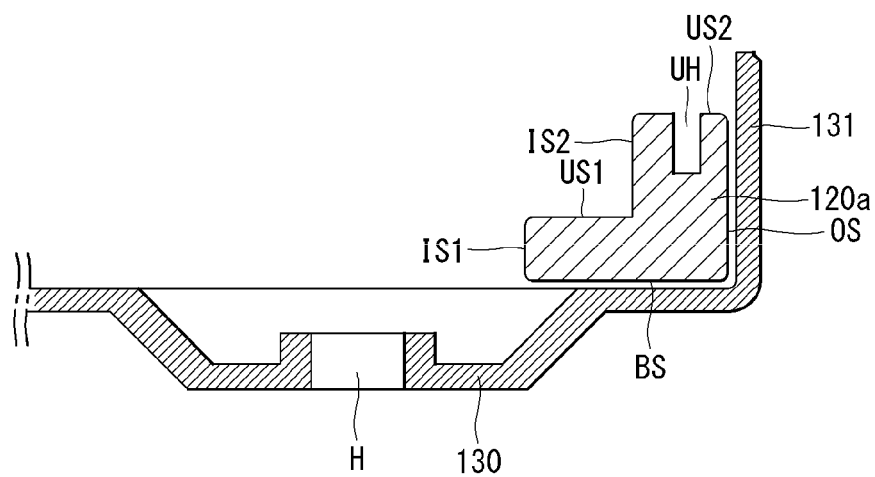
Figure 33:
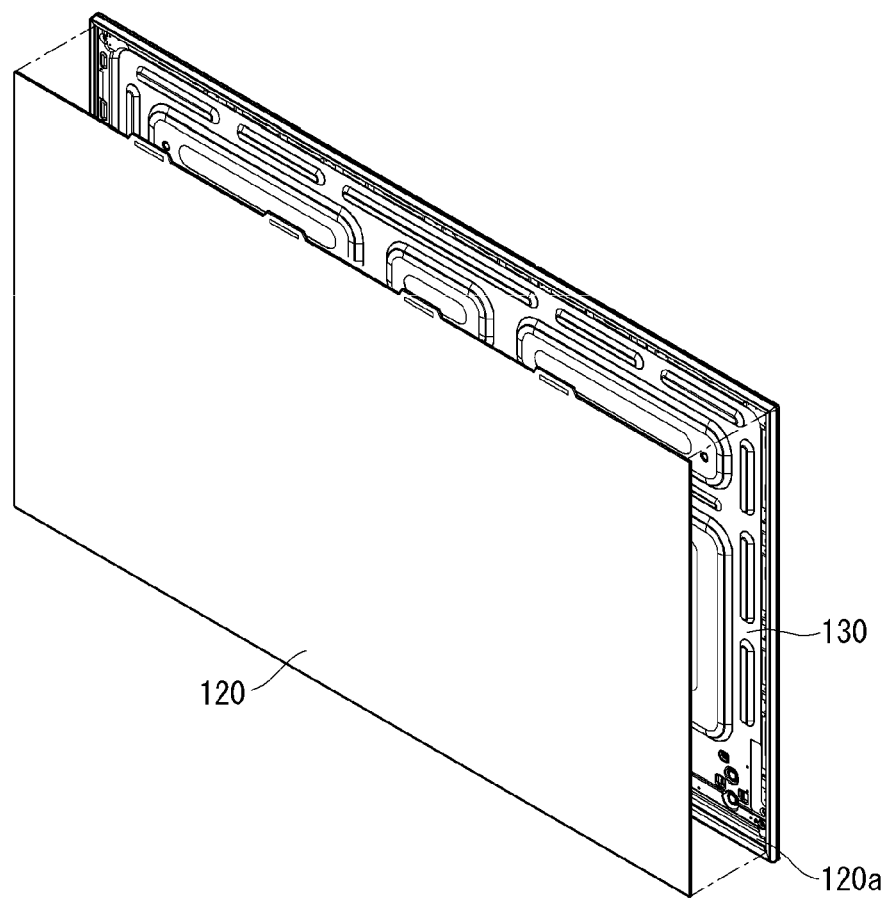
Figure 34:
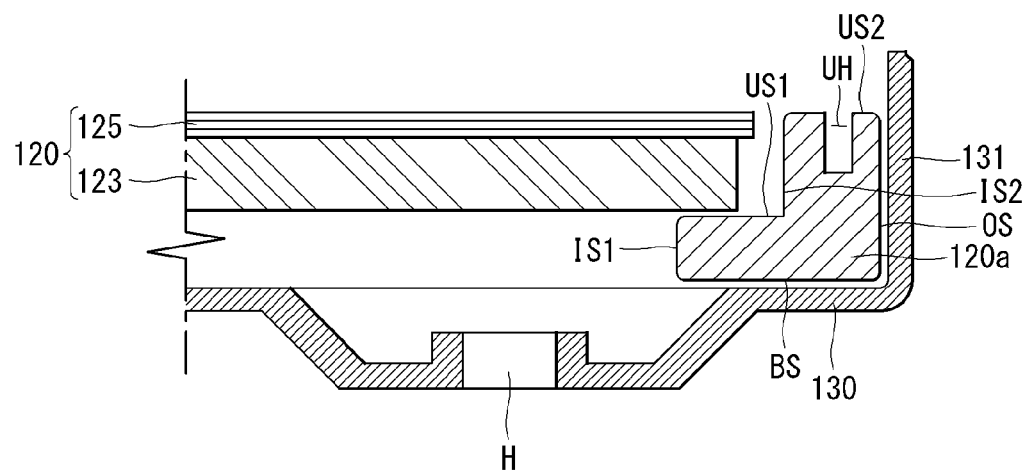

As shown in FIGS. 29-46, the front cover can be a single piece and instead of having a rear wall, a separately attached fixer can be used. According to this embodiment, manufacturing efficiency can be improved when compared to the manufacturing method shown in FIGS. 11-23. For example, as shown in FIGS. 29-46, the components of the display device can be vertically stacked, in a convenient manner, thus improving manufacturing efficiency (e.g., with an automated process). For example, a method of manufacturing a display device can include vertically stacking a unit holder on an inner surface of a main frame, vertically stacking a backlight unit on the unit holder, vertically stacking a guide panel on the backlight unit, the unit holder and the main frame, vertically stacking a display panel on the guide body of the guide panel, vertically stacking a front cover on guide panel, and coupling a fixer to a rear surface of the main frame and the front cover, in order to hold the components together. For example, at least a majority of the assembly process can be conveniently performed with fewer steps, in a top down manner of vertically stacking components on top of each other. Referring to FIGS. 29 and 30, the main frame 130 can support the components of the display device. The main frame 130 can have a plurality of holes. The main frame 130 can have a frame wall 131 extending along an edge of the main frame. The frame wall 131 can extend toward the forward direction of the display.

Referring to FIGS. 31 to 34, the main frame 130 can support the backlight unit 120 on the inner surface of the main frame 130. In addition, a holder 120a of the backlight unit 120 can be disposed along the rim or edge of the inner surface of the main frame 130.

The holder 120a of the backlight unit 120 can be mounted on the inner edge or corner of the main frame 130.

The optical assembly 123 and the optical sheet 125 can be disposed in front of the main frame 130 and on the holder 120a of the backlight unit 120.

The optical assembly 123 and the optical sheet 125 can be spaced apart from the front surface of the main frame 130 and can be in contact with the holder 120a of the backlight unit 120. The rim of the optical assembly 123 and the optical sheet 125 can be adjacent to the first upper surface US1 of the holder 120a and away from the second inside surface IS2.

Figure 35:
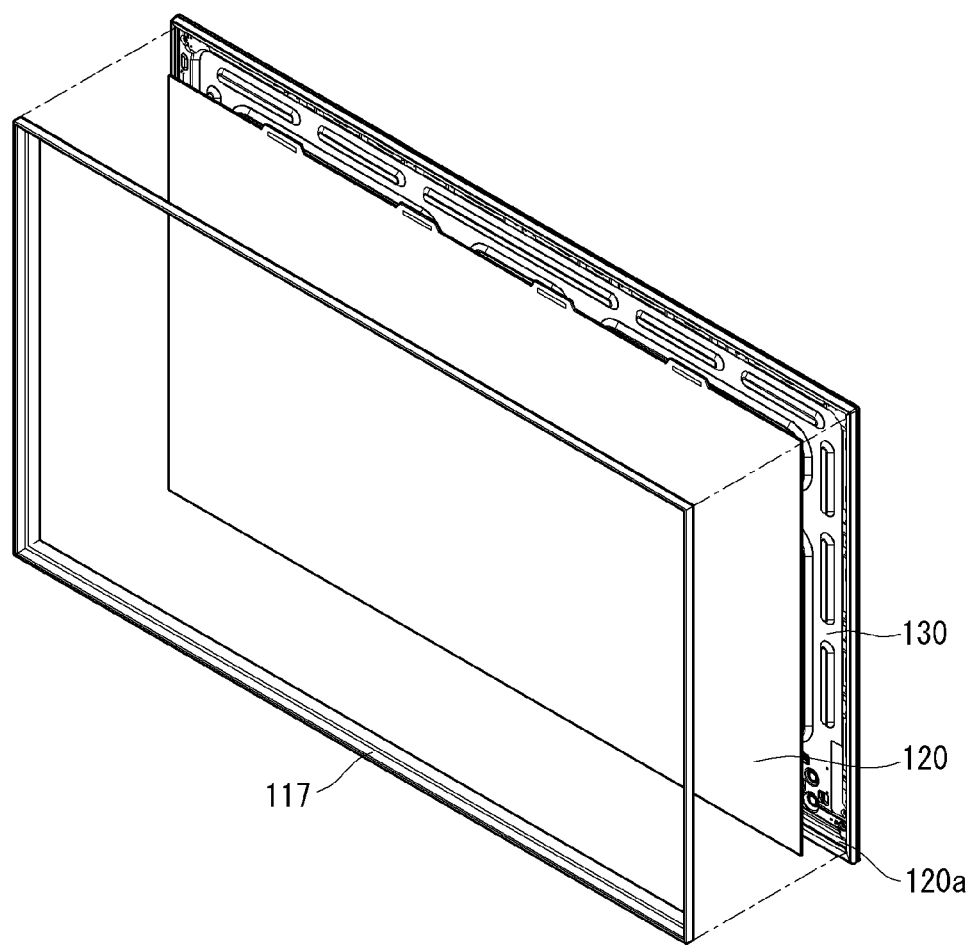
Figure 36:
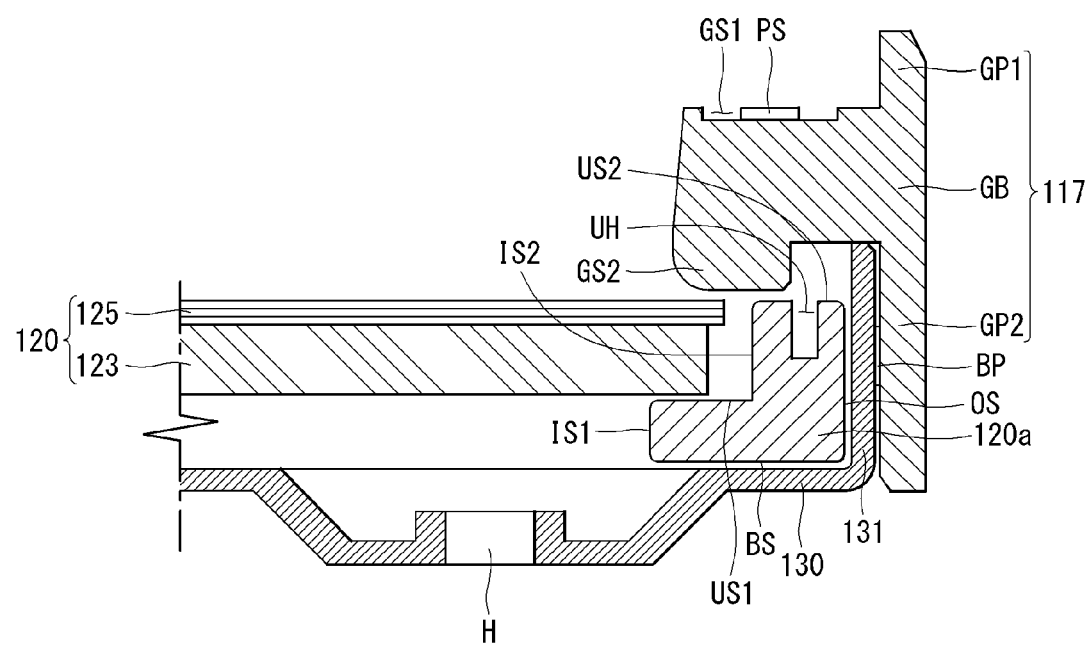

Referring to FIGS. 35 and 36, the guide panel 117 can be coupled to the main frame 130 in a top-down manner. The guide panel 117 can be supported by the upper part of the frame wall 131.

The guide panel 117 can include a guide body GB, guide protrusions GP1 and GP2, and guide seating portions GS1 and GS2.

Figure 37:
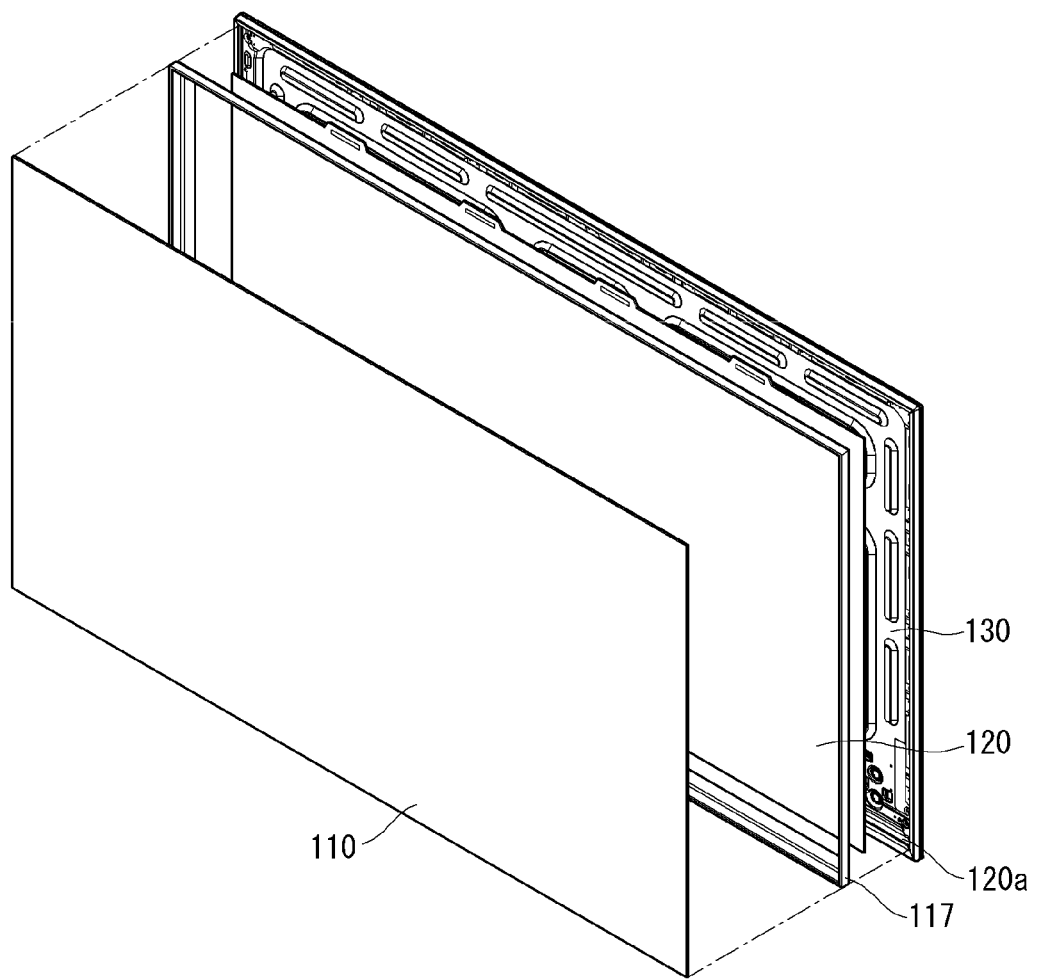
Figure 38:
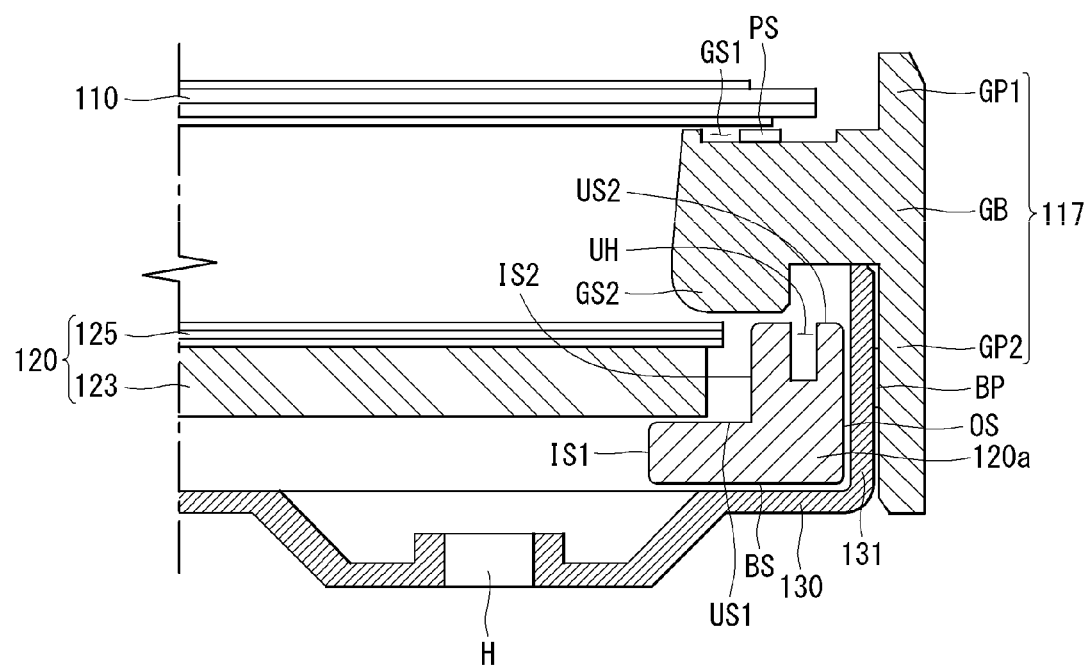
Figure 39:
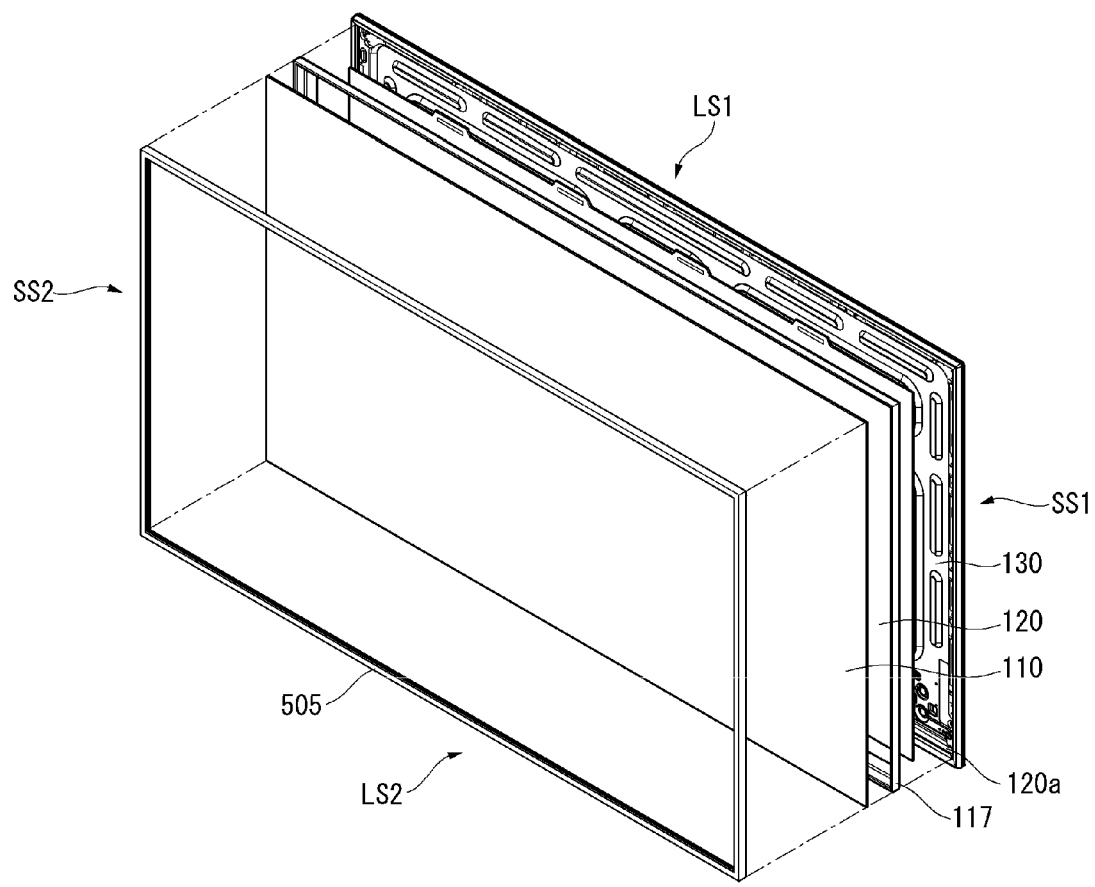

Referring FIGS. 37 and 38, the display panel 110 can be seated or mounted on the guide panel 117. The rear surface or back surface of the display panel 110 can be in contact with the panel seating member PS of the guide panel 117.

Referring to FIGS. 39 to 43, the front cover 505 can be assembled to the guide panel 117, and the main frame 130. Also, the front cover 505 can face the outer surface of the guide panel 117.

When the front cover 505 is assembled, the plurality of fixer members 160 can be coupled with the main frame 130 and inserted into the front cover 505 with the hook 505a3.

The fixer 160 can include a body portion 161 and a fixer hook 162.

The body portion 161 can be formed in a predetermined flat plate. The body portion 161 can be in contact with the main frame 130.

The fixer hook 162 can be extended and bent from the body portion 161 of the fixer 160. The fixer hook 162 can be bent from the body portion 161. The fixer hook 162 can be in contact with the front cover 505. The fixer hook 162 can be inserted into the hook 505a3 of the front cover 505.

The fixer 160 fixes the front cover 505 to the main frame 130 by fastening the body portion 161 to the main frame 130 and fastening the fixer hook 162 to the front cover 505.

The body portion 161 can be arranged or aligned with the fixer hole FH. The fixer hole (FH) can penetrate through the body portion (161). The fixer hole FH can be disposed in a central region of the body portion 161.

The fastening member S can be fastened to the main frame 130 through the fixer hole FH. The fastening member S can fix the fixer 160 to the main frame 130.

Figure 44:
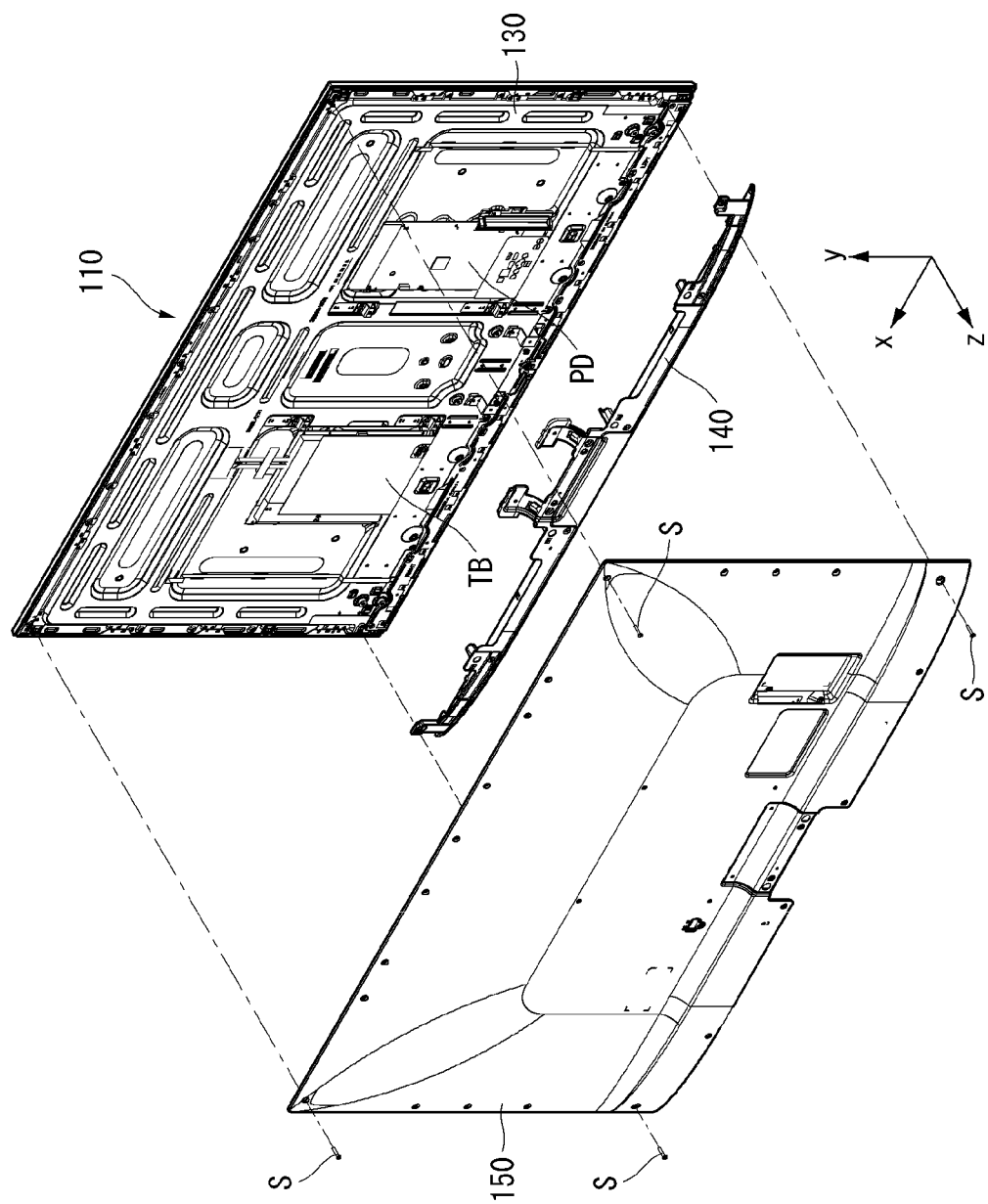
Figure 45:
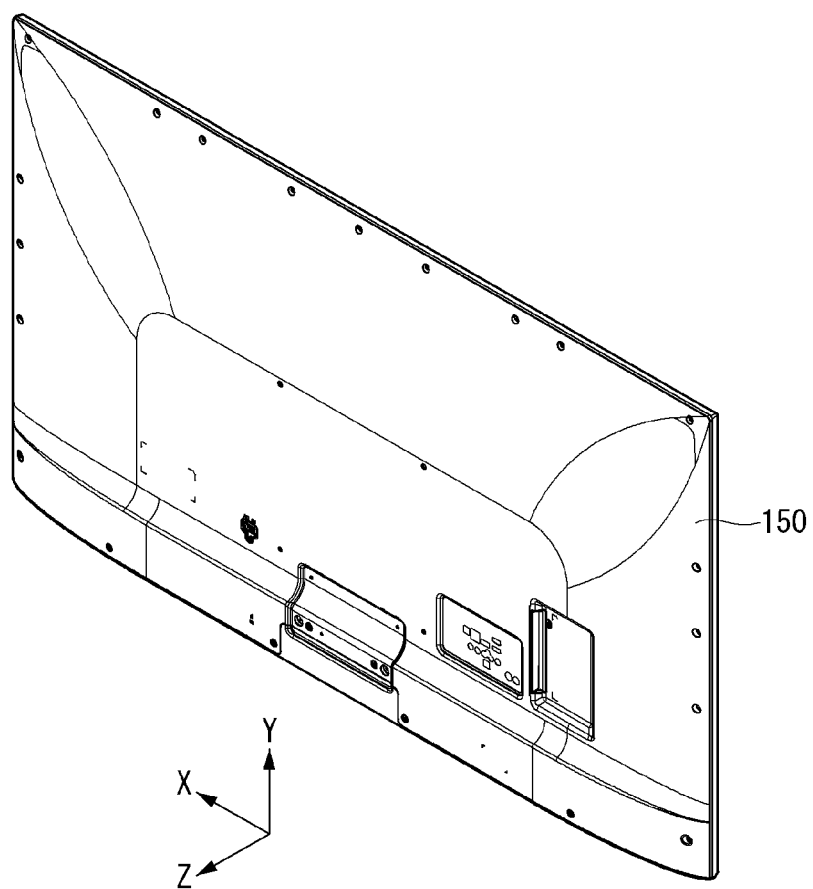
Figure 46:
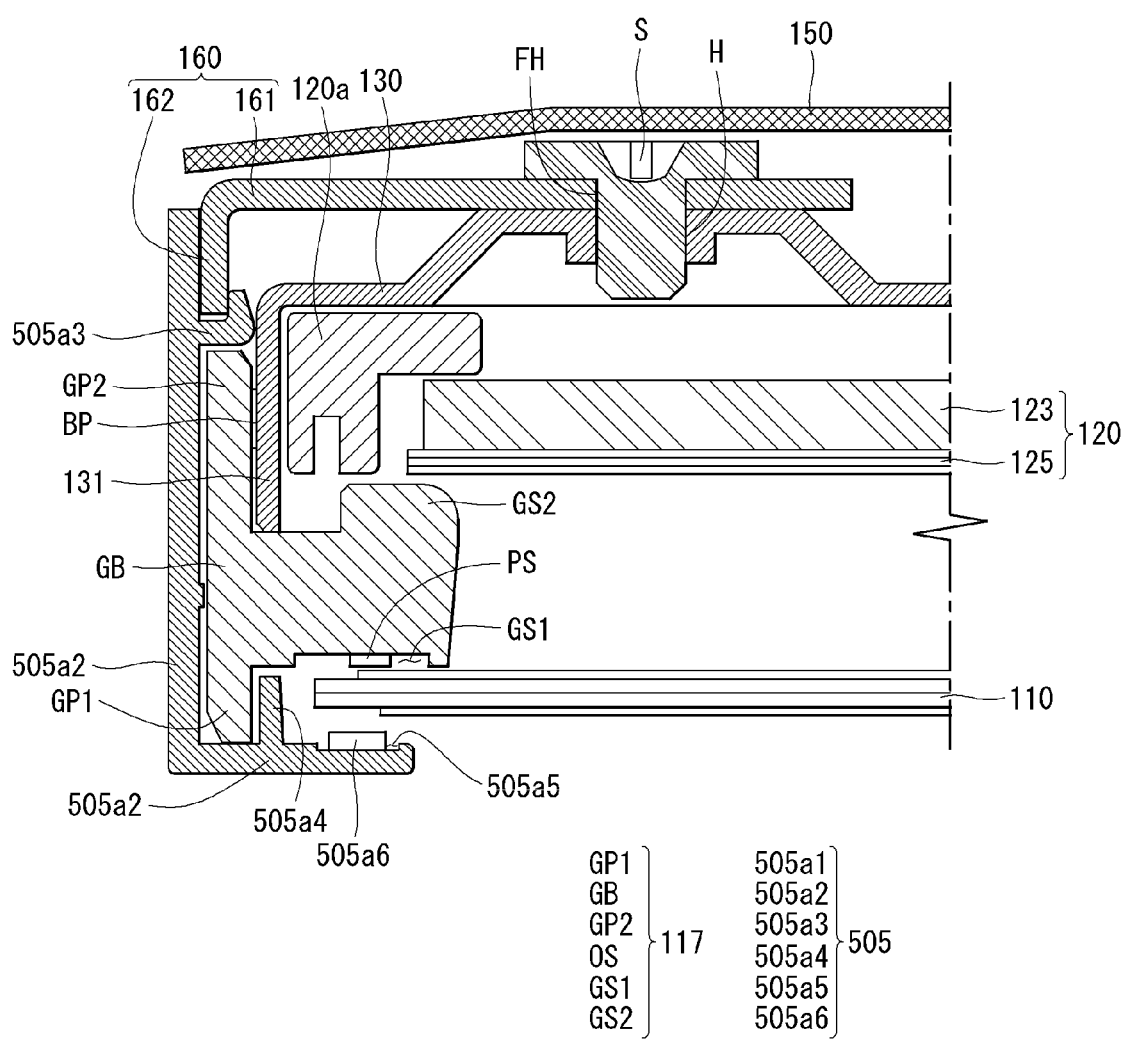

Referring to FIGS. 44 to 46, the source shield 140 can be mounted on the rear surface of the main frame 130. The T-con board TB and the panel driver PD can be mounted on the rear surface of the main frame 130.

The T-con board TB can be electrically connected to the panel driver PD by a flexible flat cable (FFC). At least one circuit or semiconductor can be mounted on the panel driver PD supplying a drive signal to the display panel 110. The T-con board TB can be electrically connected to the pad unit via a flexible flat cable (FFC). The T-con board TB can be referred to as a main control unit.

After the panel driver PD is mounted on the main frame 130, the display device 100 (see FIG. 1) can be performed for aging and various inspections.

Thereafter, the back cover 150 can be coupled to the rear surface of the main frame 130.

The main frame 130 can have a plurality of holes. The plurality of holes 130 can be spaced apart from each other on the back surface of the main frame 130.

The back cover 150 can have a plurality of holes corresponding to the holes of the rear cover 130. The fastening member S is fastened to the holes of the main frame 130 through the holes of the back cover 150 so that the back cover 150 can be fixed to the main frame 130.

According to an embodiment, manufacturing efficiency can be improved and components of the display device can be vertically stacked, in a convenient manner, thus improving manufacturing efficiency. For example, at least a majority of the assembly process can be conveniently performed with fewer steps, in a top down manner of vertically stacking components on top of each other.

The foregoing embodiments are merely examples and are not to be considered as limiting the present disclosure. The present teachings can be readily applied to other types of methods and apparatuses. The features, structures, methods, and other characteristics of the embodiments described herein can be combined in various ways to obtain additional and/or alternative embodiments.

Certain embodiments or other embodiments of the invention described above are not mutually exclusive or distinct from each other. Any or all elements of the embodiments of the invention described above can be combined or combined with each other in configuration or function.

For example, a configuration "A" described in one embodiment of the invention and the drawings and a configuration "B" described in another embodiment of the invention and the drawings may be combined with each other. Namely, although the combination between the configurations is not directly described, the combination is possible except in the case where it is described that the combination is impossible.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A display device comprising:
   a display panel;
   a main frame positioned behind the display panel;
   a guide panel coupled to the main frame and supporting the display panel; and
   a front cover coupled to the main frame and covering a side of the display panel,
   wherein the front cover includes:
   a side wall covering the side of the display panel and a side of the main frame; and
   a front wall extending from the side wall and facing a front surface of the display panel, and
   a hook protruding from an inside of the side wall,
   wherein a fixer is fixed to a rear surface of the main frame and inserted into the hook, and
   wherein the guide panel comprises:
   a guide body supporting the display panel;
   a first guide protrusion extending from the guide body in a first direction toward the front wall of the front cover; and
   a second guide protrusion extending from the guide body in a second direction away from the first direction.

2. The display device of claim 1, wherein the display panel, the main frame, and the guide panel are vertically stacked on each other.

3. The display device of claim 1, wherein the front cover includes a protrusion protruding from an inner surface of the front wall toward the guide panel, and
   wherein a side surface of the protrusion of the front wall faces an inner surface of the first guide protrusion.

4. The display device of claim 3, wherein the display panel is seated on the guide body of the guide panel, and
   wherein the protrusion of the front wall is positioned between the side of the display panel and the first guide protrusion.

5. The display device of claim 1, wherein the fixer includes:
   a body portion fixed to the rear surface of the main frame; and
   a fixer hook extending from the body portion and bent toward the side wall of the front cover, and
   wherein the fixer hook is fixed to the hook of the front cover.

6. The display device of claim 5, wherein the body portion of the fixer is coupled to the rear surface of the main frame by a fastener.

7. A display device comprising:
- a display panel;
- a backlight unit;
- a main frame surrounding the backlight unit;
- a guide panel surrounding the display panel, the backlight unit and the main frame;
- a first guide protrusion extending from a guide body of the guide panel;
- a second guide protrusion extending from the guide body in a different direction than the first guide protrusion;
- a front cover including a side wall covering the side of the display panel, a side of the guide panel and a side of the main frame, and a front wall extending from the side wall and facing a front surface of the display panel;
- a protrusion protruding from an inner surface of the front wall toward the guide panel; and
- a fixer coupled to a rear surface of the main frame,
- wherein a side surface of the protrusion, an inner surface of the front wall and a side surface of the side wall surround the first guide protrusion to couple the front cover to the guide panel.

8. The display device of claim 7, wherein the display panel, the backlight unit, the guide panel and the front cover are vertically stacked on each other.

9. The display device of claim 7, wherein the display panel, the back light unit, the main frame and the guide panel are sandwiched between the inner surface of the front wall and an inner surface of the fixer.

10. The display device of claim 8, wherein the fixer includes:
- a body portion fixed to the rear surface of the main frame; and
- a fixer hook extending from the body portion and bent toward the side wall of the front cover, and
- wherein the fixer hook is fixed to a hook protruding from an inside of the side wall of the front cover.

11. The display device of claim 7, wherein the guide body is disposed between the display panel and the backlight unit.

12. The display device of claim 7, further comprising a unit holder supporting the backlight unit,
- wherein the unit holder is disposed between the main frame and both the backlight unit and the guide body of the guide panel.

13. The display device of claim 7, wherein the fixer includes:
- a body portion fixed to the rear surface of the main frame; and
- a fixer hook extending from the body portion and bent toward the side wall of the front cover, and
- wherein the fixer hook is fixed to the hook of the front cover.

* * * * *